United States Patent [19]
Hirohashi et al.

[11] Patent Number: 5,600,471
[45] Date of Patent: Feb. 4, 1997

[54] OPTICAL WIRELESS DATA TRANSMISSION SYSTEM AND OPTICAL WIRELESS DATA TRANSMITTING/RECEIVING APPARATUS

[75] Inventors: Kazutoshi Hirohashi, Yokohama; Yoshiaki Yunoki, Tokyo, both of Japan

[73] Assignee: Victor Company of Japan, Ltd., Yokohama, Japan

[21] Appl. No.: 430,041

[22] Filed: Apr. 27, 1995

[30] Foreign Application Priority Data

Apr. 28, 1994 [JP] Japan .................................. 6-113897
Aug. 10, 1994 [JP] Japan .................................. 6-209080

[51] Int. Cl.⁶ ........................................ H04B 10/00
[52] U.S. Cl. .................. 359/152; 359/143; 359/172; 340/825.72; 370/491
[58] Field of Search .................. 359/113, 143, 359/152–153, 172; 340/825.72; 370/74, 98; 375/361

[56] References Cited

U.S. PATENT DOCUMENTS

| | | | |
|---|---|---|---|
| 3,742,225 | 6/1973 | Sick et al. ............................. | 250/566 |
| 4,850,044 | 7/1989 | Block et al. ........................... | 359/163 |
| 5,075,792 | 12/1991 | Brown et al. .......................... | 359/152 |
| 5,247,380 | 9/1993 | Lee et al. .............................. | 359/143 |
| 5,349,463 | 9/1994 | Hirohashi et al. ..................... | 359/174 |
| 5,408,350 | 4/1995 | Perrier et al. ......................... | 359/113 |

FOREIGN PATENT DOCUMENTS

| | | | |
|---|---|---|---|
| 0599522 | 6/1994 | European Pat. Off. ............... | 359/152 |
| 6224858 | 8/1994 | Japan . | |

*Primary Examiner*—Wellington Chin
*Assistant Examiner*—Kinfe-Michael Negash
*Attorney, Agent, or Firm*—Lowe, Price, LeBlanc & Becker

[57] ABSTRACT

An optical wireless transmission system providing short-distance communication, such as for linking a personal computer to a LAN, utilizes direct baseband modulation of optical signals, but provides simultaneous bidirectional transmission of data between a pair of optical transmitting/receiving units while also enabling a data clock signal to be easily regenerated from a received optical signal. Effects of signal noise due to artificial illumination are eliminated by a suitable choice of transmission bandwidth, and bandpass filtering of a received data signal.

24 Claims, 24 Drawing Sheets

FIG. 4 (A)
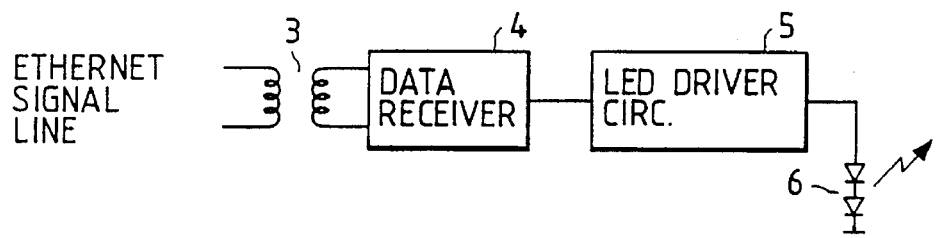
FIG. 4 (B)
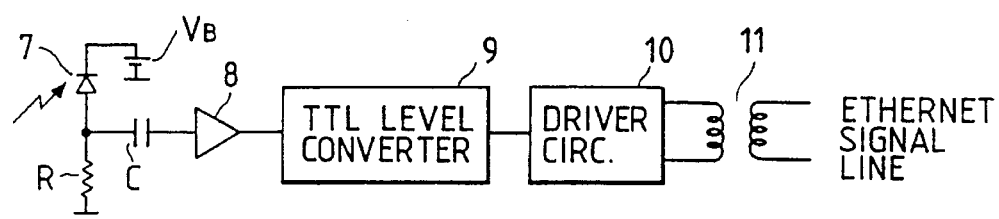
FIG. 5 (A)
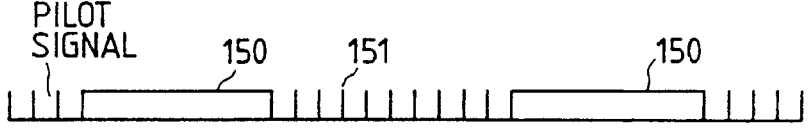
FIG. 5 (B)
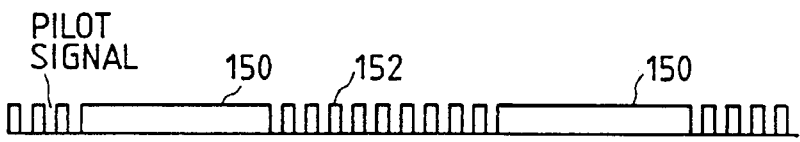
FIG. 5 (C)

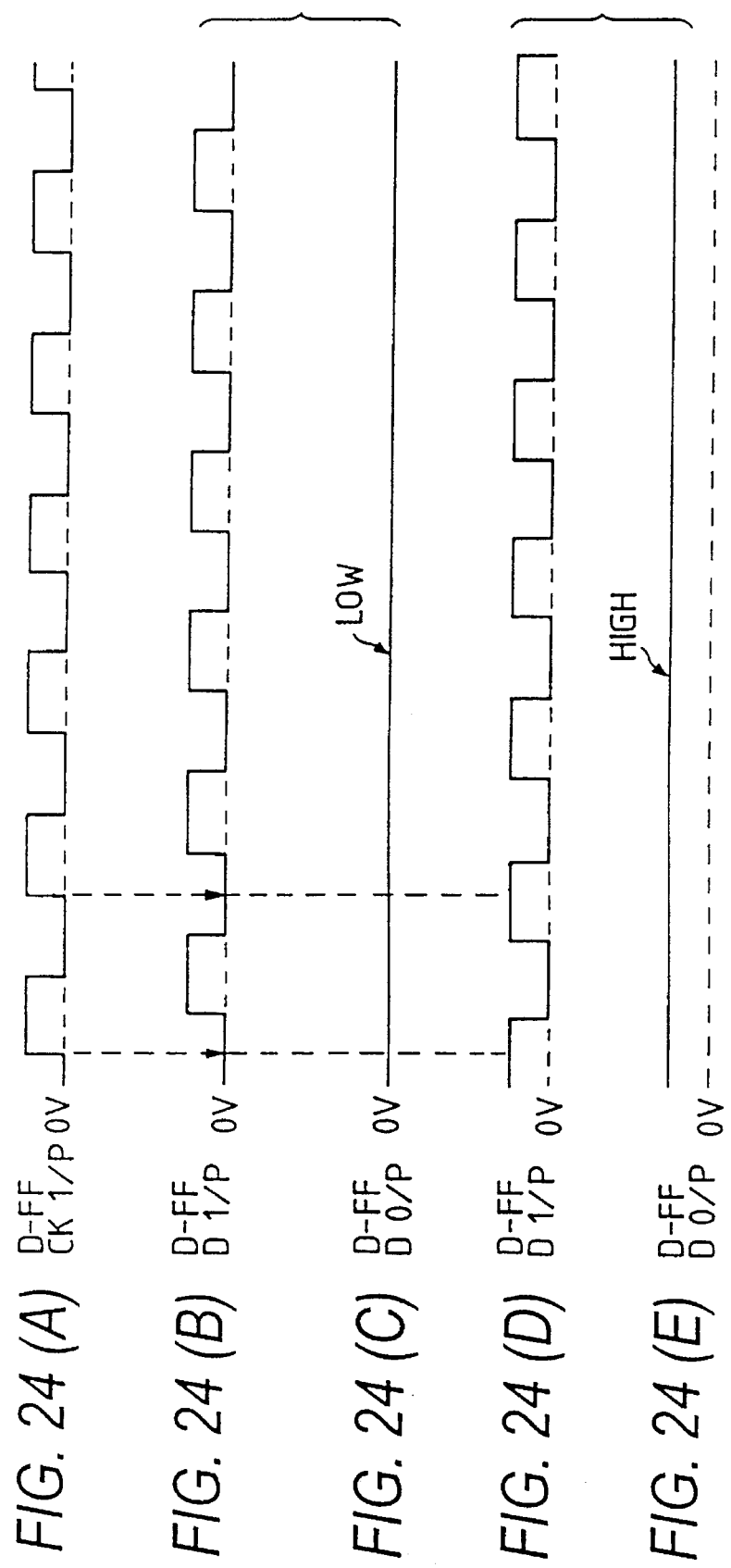

OPTICAL WIRELESS DATA TRANSMISSION SYSTEM AND OPTICAL WIRELESS DATA TRANSMITTING/RECEIVING APPARATUS

FIELD OF THE INVENTION

The present invention relates to an optical wireless data transmission system for transferring data between a plurality of optical wireless transmitting/receiving apparatuses, and in particular to an optical wireless data transmission system which enables simultaneous bidirectional wireless transmission of data between portable data processing terminals such as laptop personal computers and a wired network such as a local area network.

DESCRIPTION OF PRIOR ART

In the prior art, in order to connect a plurality of personal computers such as desktop personal computers to a LAN (local area network), it has generally been necessary to established fixed electrical connections, i.e. by using an electrical wiring system. Such a wired connection system has the advantages of ensuring reliability of the connections, with a low level of data errors arising in transmission as a result of such factors as induced electrical noise. However a wired connection system has the disadvantage of a high installation cost, and the need for performing installation work when any changes must be made in the layout of the system.

In recent years, highly portable types of data processing terminals, such as laptop personal computers and book-type personal computers have come into widespread use. The advantage of portability of such personal computers is lost, if they must be fixedly wired into a system, such as a LAN. For that reason, temporary connection of a portable personal computer to a network such as a LAN is generally established, by means of electrical plugs and sockets. However, this leads to inconvenience to the user, since for example in the case of connection to an office network, the user may have to make changes to such connections upon entering or leaving his office. Furthermore in practice it is found that such electrical plugs and sockets are a major source of unreliability, due to factors such as the inevitable wear and corrosion which affect the electrical contact surfaces, the possibility of mechanical damage as a result of repetitive insertions and removals of plugs, etc.

There is therefore a requirement for enabling reliable connection for data transmission to be easily established between portable personal computers and a wired network, by a path which is partially or entirely of wireless type.

Two basic types of wireless transmission are possible, i.e. radio transmission using electromagnetic waves and optical transmission using light. Optical transmission has the advantage of providing a very wide transmission bandwidth, so that there is virtually no upper limit on the speed at which data can be transmitted. The Ethernet type of LAN, which is the most widely used type of LAN at present, has a data transmission rate of 10 Mbps, so that any wireless data transmission path should be capable of conveying data at a rate of at least 10 Mbps. Moreover, in order for a wireless transmission path to replace a wired transmission path, it should be capable of providing completely bi-directional transmission.

In the case of optical wireless transmission, it is necessary to take measures to prevent interference due to noise that results from artificial illumination. In recent years, inverter-type fluorescent lamps have come into widespread use, which generate optical noise at frequencies of approximately 1 MHz. Hence, it is preferable to set the transmission band for optical wireless transmission within a range which is higher than several MHz. In that case, when data are expressed in the usual NRZ (non return to zero) binary code form, it is not possible to simply execute baseband modulation of a light beam by the data which are to be transmitted, due to the optical noise problem. In the prior art, broad-band modulation has been used, i.e. by converting the baseband signal to a higher frequency band, by a modulation method such as FSK, PSK, or ASK, so that interference in the received signal due to artificial illumination can be excluded by filtering.

In the case of an optical wireless data transmission system which uses broad-band transmission, the circuit scale of the transmitting/receiving apparatuses of the system become large, due to the need to provide modulation and demodulation circuits, and the manufacturing cost becomes accordingly high. Moreover, in order to accurately demodulate the received signal, it is necessary to regenerate a data clock signal from the received signal. To enable such clock signal regeneration, it becomes necessary to form the data into packets for transmission by using a method such as HDLC (High-level Data Link Control). Hence the overall circuit configuration becomes complex.

SUMMARY OF THE INVENTION

It is an objective of the present invention to overcome the problems of the prior art set out above, by providing an improved optical wireless data transmission system which is resistant to noise interference produced by artificial illumination, which has a simple circuit configuration, which does not require wide-band modulation to be performed for optical transmission, and which enables a data clock signal to be easily recovered from a received optical signal.

It is a further objective to provide an improved optical wireless data transmitting/receiving apparatus which is suitable for application to portable data processing terminals such as portable personal computers, whereby a transmission path between a wired network such as a local area network and a personal data processing terminal can be quickly and easily established without making a wired connection or plug-in connection between the network and the personal data processor, while enabling the personal data processing terminal to be freely positioned on a work surface such as a desk top.

It is a further objective of the invention to provide an optical wireless signal transmission system which is suitable for short-distance transmission of high-frequency modulated optical signals, such as a combination of frequency modulation audio and video signals.

To achieve the above objectives, in the case of optical data transmission, a transmission system according to the invention transmits data in biphase code form, such as Manchester code. In that form, direct baseband modulation of emitted light can be performed, while a data clock signal can be easily recovered from a resultant received optical signal. By ensuring sufficient optical isolation between the transmitting and receiving sections of each optical data transmitting and receiving apparatus in the system, simultaneous bidirectional data transmission between two of such apparatuses becomes practical.

More specifically, according to a first aspect the invention provides an optical wireless data transmission system providing simultaneous bidirectional transmission of data by optical signals between at least a first optical signal transmitting and receiving apparatus and a second optical signal transmitting and receiving apparatus, each of the first and second optical signal transmitting and receiving apparatuses including photoemissive means for producing a transmitted optical signal and photoreceptive means for converting a received optical signal to a reception signal, wherein each of the first and second optical signal transmitting and receiving apparatuses comprises:

isolating means for optically isolating the photoreceptive means thereof from an optical signal emitted by the photoemissive means thereof; and means for generating the optical signal from a biphase code electrical signal by baseband modulation of an intensity of light which is emitted by the photoemissive means thereof.

If the data are conveyed as data packets, then each of the first and second optical signal transmitting and receiving apparatuses can comprise means for inserting into the optical signal generated by the photoemissive means thereof, within each of respective idle intervals between the data packets, a pilot signal having an amplitude which is similar to an amplitude of the optical signal within the data packets. This will ensure satisfactory automatic gain control operation in a data receiving circuit which amplifies a received optical signal.

The photoemissive means and photoreceptive means of each of the first and second optical signal transmitting and receiving apparatuses apparatus are preferably configured to have broad directionality in a horizontal direction and narrow directionality in a vertical direction.

Such an optical wireless data transmission system can further comprise magnetic attraction means for retaining the first and second optical signal transmitting and receiving apparatuses in a mutually removably attached condition, with an optical communication path established between them. The magnetic attraction means preferably comprises respective permanent magnets which are attached to the first and second optical transmitting and receiving apparatuses.

The second optical signal transmitting and receiving apparatus can be formed upon a card which is entirely contained within a slot of a personal computer, with the photoemissive means and photoreceptive means of the second optical signal transmitting and receiving apparatus formed upon an edge portion of the card which is exposed to the exterior of the slot.

Alternatively, the second optical signal transmitting and receiving apparatus can be formed upon a card which can be entirely contained within a slot of a personal computer, with the photoemissive means and photoreceptive means of the second optical signal transmitting and receiving apparatus formed upon an edge portion of the card which is adjacent to the exterior of the slot, with the second optical signal transmitting and receiving apparatus further comprising a movable member provided with a mirror surface, the member being selectively movable to a retracted position within the slot and to an extended position which is external to the slot, the mirror surface being oriented to provide an increased size of service area for optical communication when the member is in the extended position.

As another alternative arrangement, the second optical signal transmitting and receiving apparatus can be provided with a movable member having the photoemissive means and the photoreceptive means respectively mounted thereon, the member being selectively movable to a retracted position within the slot and to an extended position which is external to the slot.

If the data to be transmitted are conveyed as data packets, then at least one of the first and second optical signal transmitting and receiving apparatuses can include return light cancellation means comprising:

pilot signal insertion means for inserting a pilot signal of fixed frequency into an input data signal which conveys the data packets, within each of respective idle intervals between the data packets, to thereby obtain a transmission signal, and for supplying the transmission signal to the photoemissive means to produce a transmitted optical signal;

filter means for extracting, from a reception signal produced by the photoreceptive means, a detection signal component having an identical frequency to the pilot signal;

comparator means for executing phase comparison between the pilot signal and the detection signal component, and for obtaining an amplitude control signal which varies in level in accordance with results of the phase comparison;

means for applying a fixed amount of phase adjustment to the transmission signal to obtain an adjustment signal, and means responsive to the amplitude control signal for altering the amplitude of the adjustment signal to obtain a cancellation signal; and means for subtracting the cancellation signal from the reception signal, to thereby reduce the amplitude of the detection signal component.

According to another aspect, the invention provides an optical wireless signal transmission system providing signal transmission between at least a first optical signal transmitting and receiving apparatus and a second optical signal transmitting and receiving apparatus, each of the first and second optical signal transmitting and receiving apparatuses including modulator means for producing a transmission signal, photoemissive means responsive to the transmission signal for producing an optical signal, photoreceptive means for converting a received optical signal to a reception signal, and demodulator means for demodulating the reception signal, wherein at least one of the first and second optical wireless transmitting and receiving apparatuses comprises return light cancellation circuit means, comprising:

filter means for extracting from the reception signal a detection signal component which is within a predetermined bandwidth;

phase comparator means coupled to receive from the modulator circuit means a reference signal which is a component of the transmission signal and is within the predetermined bandwidth, for executing phase comparison between the detection signal component and the reference signal and for obtaining an amplitude control signal having a level determined in accordance with results of the phase comparison;

means for applying a specific amount of phase shift to the transmission signal to obtain an adjustment signal, and means controlled by the amplitude control signal for altering the amplitude of the adjustment signal to obtain a cancellation signal; and means for subtracting the cancellation signal from the reception signal, to thereby reduce the amplitude of the detection signal component.

BRIEF DESCRIPTION OF THE DRAWINGS

FIG. 4(A) is a system block diagram of a transmitting section and;

FIG. 4(B) is a system block diagram of a receiving section of a first embodiment of an optical transmitting/receiving apparatus;

FIGS. 5(A)–5(C) are timing diagrams for use in describing the insertion of a pilot signal between successive packets of a transmitted data stream, for improved AGC response of a receiving circuit;

FIGS. 19(A) and 19 (B) are diagrams of a fourth embodiment of an optical transmitting/receiving apparatus for insertion into a personal computer, provided with an extendable mirror;

FIG. 24 is a timing diagram for describing the operation of a phase comparator used in the embodiment of FIG. 22;

DESCRIPTION OF PREFERRED EMBODIMENTS

Figure 1:
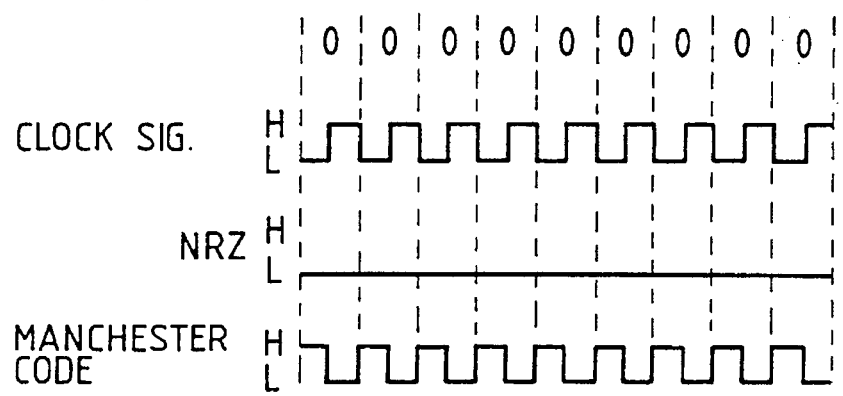
FIGS. 1(A)–1(C) are timing diagrams for use in describing a biphase code which is suitable for optical data transmission.
Figure 1:
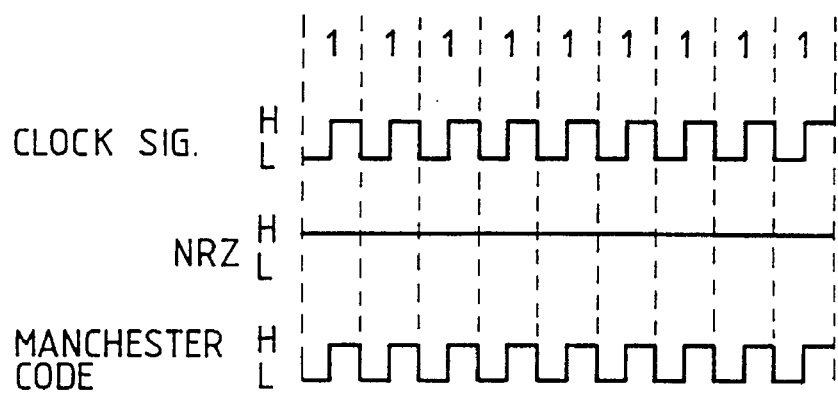
Figure 1:
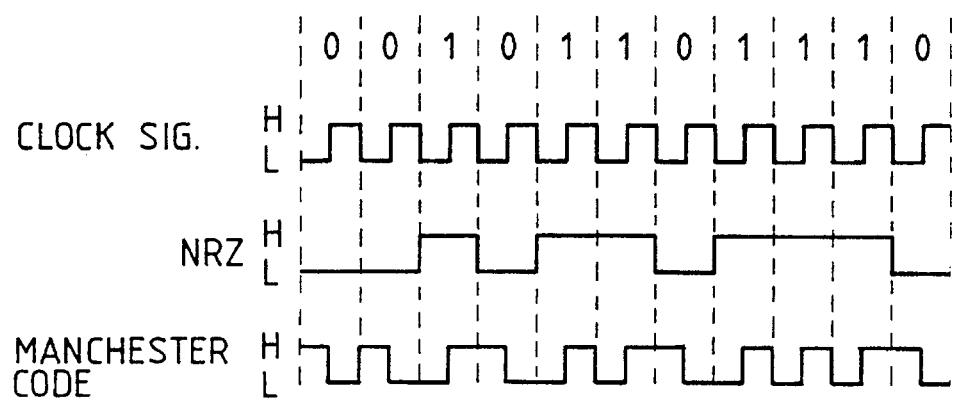

Embodiments of an optical wireless data transmission system according to the present invention will be described in the following, referring to the drawings. It will be generally assumed in the following that the embodiments are applied to an Ethernet LAN, however it should be noted that the invention is of course not limited to use with such a network. The basis of an optical wireless data transmission system according to the present invention is to enable data transmission between two optical wireless data transmitting/receiving apparatuses which will be referred to in the following simply as optical T/R apparatuses, i.e. one of which is electrically connected for signal transfer to/from to a personal computer and the other of which is electrically connected for signal transfer to/from a wired network such as an Ethernet LAN. Each optical T/R apparatus consists of an optical transmitting section and an optical receiving section. Data are transmitted between such optical T/R apparatuses in the form of a biphase signal, i.e. as a baseband signal which enables a data clock signal to be directly regenerated. The biphase signal is applied to intensity-modulate the light which is produced by the optical transmitting section of an optical T/R apparatus. Simultaneous bidirectional data transmission is possible between two such optical T/R apparatuses.

One form of biphase signal code which is generally used for data transmission in an Ethernet LAN is the Manchester code. Transmission of data in Manchester code form enables the data clock signal to be easily recovered, so that accurate recovery of the original data can be achieved. A Manchester code signal will first be described referring to the timing diagrams of FIGS. 1 to 3. In FIG. 1, each of diagrams (A) to (C) show data that are to be coded, the data clock signal, the corresponding NRZ (Non Return to Zero) code form of the data, and the corresponding Manchester code form of the data. Diagram (A) shows the case in which the data to be conveyed are all "0" state bits, diagram (B) shows the case in which the data are all "1" state bits, and diagram (C) shows the case in which the data are an arbitrary sequence of "1" and "0" bits. As can be understood from diagrams (A) and (B), so long as the data to be coded remain at the same logic state, the NRZ code level remains unchanged. Hence it is not possible to recover the data clock signal from the resultant coded data. Thus when separate apparatus apparatuses transmit and receive the coded data, it becomes impossible to synchronize the respective clock signals which are generated by the apparatus apparatuses, so that the original data cannot be recovered from the encoded data.

However in the case of the Manchester code, at least one transition of the code occurs in every two clock periods of the original data, i.e. the code remains at the same level for no more that two successive clock periods. In the examples of FIG. 1, such a Manchester code transition occurs each time the data clock signal goes from the L to the H level. Hence it is easily possible to recover the data clock signal from Manchester code data, so that correct synchronization can be established between the respective clock signals generated in a data transmitting apparatus and in a corresponding data receiving apparatus, and hence the original transmitted data can be accurately recovered when received.

Figure 2:
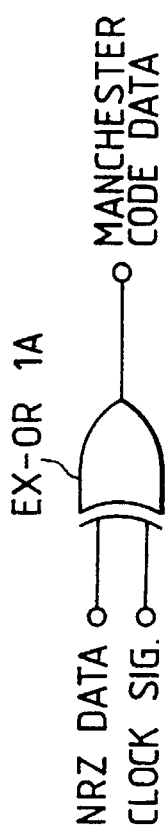
FIG. 2 shows examples of circuits for converting data from NRZ code to Manchester code and vice-versa.
Figure 2:
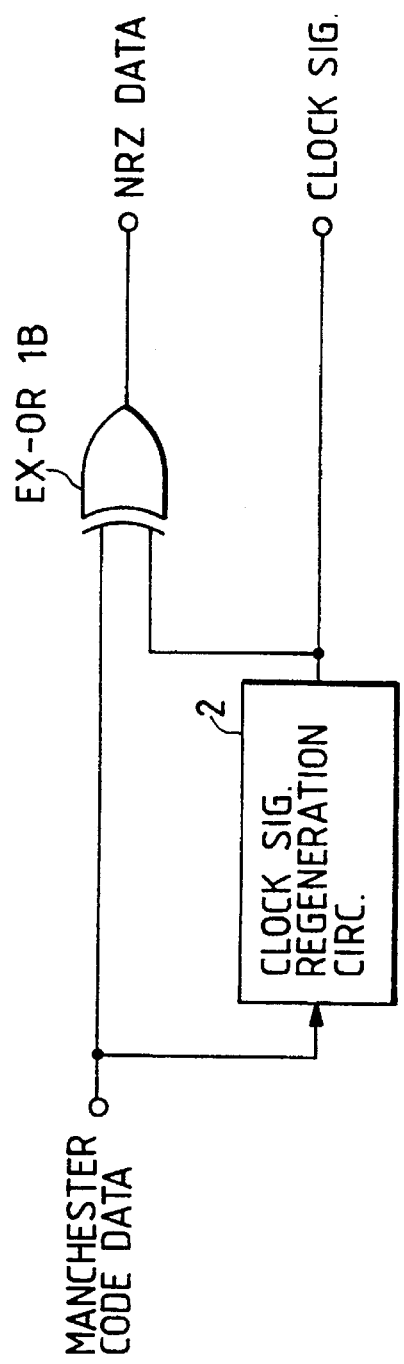

Diagrams (A) and (B) of FIG. 2 illustrate simple circuit arrangements for encoding and decoding a data stream to and from Manchester code. As shown in diagram (A), a single exclusive-OR gate can be used for encoding (assuming that the input data stream is in NRZ form). The input NRZ data are applied to one input of the exclusive-OR gate 1A, the data clock signal is applied to the other input, and Manchester code data are produced from the output of the exclusive-OR gate 1A. In diagram (B), the received Manchester code signal is applied to a clock signal regenerating circuit 2 and to one input of an exclusive-OR gate 1B, with the output from the clock signal regenerating circuit being applied to the other input of the exclusive-OR gate 1B. The clock signal regenerating circuit derives the data clock signal, based on the timings of specific transitions (e.g. each L to H transition, for the case of the Manchester code example in FIG. 1). As a result of supplying the clock signal to the exclusive-OR gate 1B together with the received Manchester code data, corresponding NRZ data is produced from the exclusive-OR gate 1B, i.e. decoding is executed to recover the original NRZ data.

Figure 3:
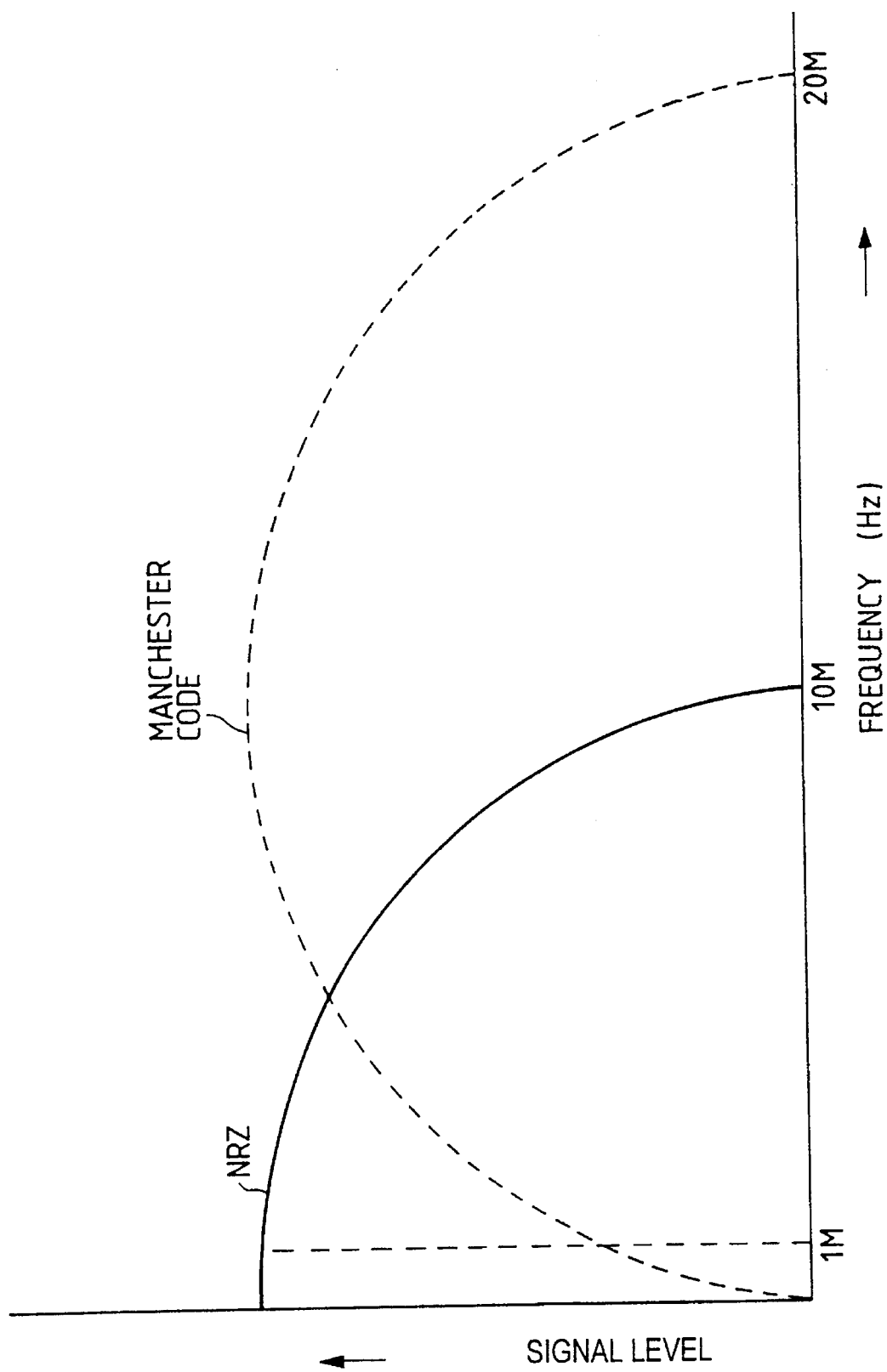
FIG. 3 is a spectrum diagram for comparing respective transmission bandwidth and signal level relationships for NRZ code and Manchester code transmission of data.

FIG. 3 is a spectrum diagram showing the relationship between transmission bandwidth for the case of transmission of an NRZ data signal at a rate of 10 Mbps, and transmission bandwidth for a Manchester code signal which has been derived by conversion from the NRZ signal as described above. As shown, the required transmission bandwidth for the Manchester code signal is approximately twice the bandwidth which is occupied by the NRZ signal. Thus, if a baseband NRZ signal is converted to a Manchester code signal, the transmission channel must have a bandwidth which is twice that required for the baseband signal. However, with the Manchester code signal, the signal level falls substantially in the low frequency region of the spectrum, in particular at frequencies of the order of 1 MHz. Thus, even if such low frequencies are eliminated by filtering in the transmission path, there will be no significant adverse effect upon operation. It thus becomes possible to eliminate the effects of optical noise sources which generate noise at frequencies in the low frequency range, such as inverter-type fluorescent lamps as mentioned above, by providing a low-pass or bandpass filter in the optical receiving section to eliminate frequencies of approximately 1 MHz and lower from the received signal. The effects of interference can thereby be reduced to a sufficient extent that they will not cause any problems with regard to satisfactory transmission.

If the transmitted optical signal is to be produced by direct intensity modulation of light by a Manchester code signal, and transmission is to be performed from an Ethernet LAN, then since data are conveyed through such a network in Manchester code form, it is only necessary to provide an E-O (electrical-to-optical) converter that is wired to the Ethernet LAN, to implement an optical transmitting section for transmitting data from the network to the receiving section of an optical wireless data T/R apparatus of a personal computer. Thus, the circuit configuration can be very simple in such a case. The receiving section of the personal computer optical T/R apparatus can consist of an O-E (optical-to-electrical) signal converter, for receiving the transmitted light and for producing an output digital signal of suitable level, such as a TTL level signal. Data can thereby be transmitted over a short-distance optical link from an Ethernet LAN to a personal computer, with the transmitting and receiving circuit requirements being extremely simple. Data transmission in the reverse direction can be similarly performed.

In FIG. 4, diagram (A) shows an example of a specific configuration for such an optical transmitting section for optically transmitting data from an Ethernet LAN, and diagram (B) shows an example of a corresponding optical receiving section, which can be provided to receive an optical signal transmitted from a personal computer. In diagram (A), data are supplied from an Ethernet signal line in Manchester code form, via an input transformer 3, to a receiver circuit 4, which amplifies the data signal to sufficient amplitude for input to a LED driver circuit 5. The LED driver circuit 5 functions as an E-O converter, by modulating the level of current which flows in a LED 6, thereby converting the electrical data signal to an intensity-modulated optical signal. In the optical receiving section, as shown in diagram (B), the transmitted modulated light is received by a PIN photodiode 7 which is subjected to a bias voltage, to thereby obtain a corresponding electrical signal across a resistor R, i.e. O-E conversion is executed. A capacitor C provides DC isolation, for supplying the data signal to an input amplifier 8, whose output is supplied to a TTL level converter circuit 9, to be thereby converted to suitable signal levels (for example, with the H level of the signal being at least 2.4 V and the L level being less than 0.4 V). The resultant signal is supplied to a driver circuit 10, to be transferred via an output transformer 10 to the Ethernet LAN.

An optical T/R apparatus of a personal computer can consist of an optical transmitting section that is basically of the form shown diagram (A) of FIG. 4, and an optical receiving section that is basically of the form shown in diagram (B), for receiving optically transmitted data from the network. However the optical transmitting section and optical receiving section will be designed to respectively receive and output suitable logic level signals for communication with the computer.

The following points must be considered with regard to a wireless optical link which provides simultaneous bidirectional data transmission between a pair of optical wireless data T/R apparatus apparatuses configured as described above. If both of the optical T/R apparatuses are simultaneously transmitting data, by signals which occupy identical frequency bands, and if a part of the light which is being transmitted from the optical transmitting section of one optical T/R apparatus should fall upon the photo-receptive element of the optical receiving section of that optical T/R apparatus (for example should fall on the PIN diode 7 of FIG. 4), then this will have the effect of superimposing optical noise upon the signal which is being received from the other optical T/R apparatus. With the present invention, that problem is overcome by ensuring that for each optical T/R apparatus, there is a sufficient degree of optical isolation between the optical transmitting section and the optical receiving section of that optical T/R apparatus, as described hereinafter. It has been found that if that is done, it is unnecessary to take special measures such as using high-frequency modulated signals for the optical data transmission, i.e. using respectively different frequency bands for the signal received by an optical T/R apparatus and the signal that is transmitted by that optical T/R apparatus.

As a result, optical wireless data T/R apparatus apparatuses configured as described above can have a very simple circuit configuration, can be manufactured at low cost, and can be effectively used to replace a wired data transmission link, between a network and a personal computer.

It should be noted that the invention is not limited to the use of the Manchester code. It is only necessary that a biphase type of code be used, so that one logic level transition of the encoded data will occur in every two clock periods of the original data. If that is ensured, then full clock signal regeneration can be achieved by a receiving apparatus, while in addition there is a rapid fall-off in level of the code signal spectrum at low frequencies, so that noise resulting from room illumination can be removed by filtering in the receiving apparatus, with no adverse effects on the received signal.

One point which must be considered with regard to optical wireless communication with a personal computer which is placed on a desk top is that the distance between the opposing optical data T/R apparatuses is not fixed. Hence the received signal level will vary. If the received signal level becomes excessively low, then satisfactory decoding to recover the original data cannot be achieved, whereas if the received signal level is excessively high, then saturation of receiving circuit elements can occur, resulting in inaccuracy of decoding to recover the original data. Specifically, in the case of the optical receiving section shown in diagram (B) of FIG. 4, saturation of the receiver circuit 8 may occur, so that incorrect data are produced from the TTL level converter circuit 9. Some types of coding, such as FSK coding, enables satisfactory decoding to be achieved even if saturation occurs in the receiving apparatus. However in the case of a biphase code signal which is produced by direct intensity modulation of light, saturation in the receiving apparatus will result in signal distortion whereby satisfactory reception cannot be ensured. It is therefore necessary to provide some form of control of the degree of amplification provided in an optical receiving section of an optical wireless data T/R apparatus, to ensure that saturation of the receiving circuits does not occur. Such control is referred to as AGC (automatic gain control), and is well known in the prior art, for controlling the amplification factor of a receiving apparatus in accordance with the level of a received signal. AGC is provided by a negative feedback control loop, and so it is necessary to take into consideration the time constant of the feedback loop, i.e. the AGC circuit cannot immediately respond to a sudden increase in level of the received signal.

This presents problems in the case of data communication with a LAN such as an Ethernet LAN, in which data are conveyed as successive packets, as will be described referring to FIG. 5. In diagram (A) of FIG. 5, two successive transmitted data packets 150 are shown, separated by an idle interval in which no data are transmitted. If such a signal is supplied to the receiving circuit of an optical receiving section having an AGC circuit, then during each interval between two successive data packets, the AGC circuit will allow the gain factor of the receiving circuit to increase to its maximum value. Thus at the start of receiving a data packet, during an interval that is determined by the time constant of the AGC circuit, excessive amplification will be applied to the received signal, so that saturation of the receiving circuit may occur.

With another embodiment of the invention, to overcome that problem, a periodic signal 151 is inserted as a pilot signal into the transmitted data stream in the idle intervals between successive data packets 150, as illustrated in diagram (B) of FIG. 5. The amplitude of the pilot signal within the optical signal which conveys the transmitted data stream is made approximately identical to that of the data packet portions of that optical signal. The pilot signal 151, when converted to an electrical signal after being received by an opposing optical T/R apparatus acts on the AGC circuit of the optical receiving section of that optical T/R apparatus to set the amplification factor of the receiving circuit at a suitable level, prior to receiving each of the data packets, so that the problem of receiver circuit saturation is effectively overcome.

Figure 6:
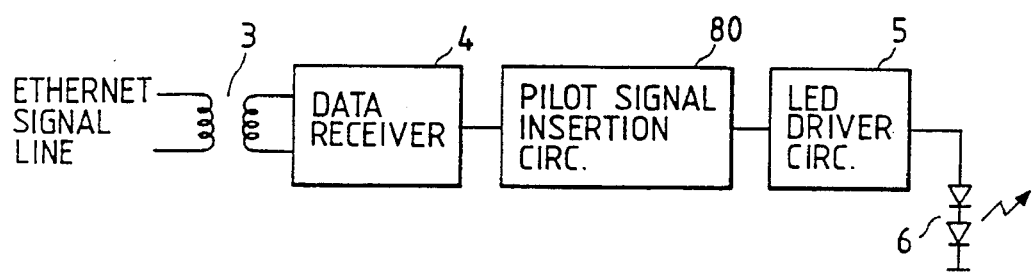
FIG. 6(A) is a system block diagram of a transmitting section.
FIG. 6(B) is a system block diagram a receiving section of a second embodiment of an optical transmitting/receiving apparatus, providing pilot signal insertion for improved AGC control.
Figure 6:
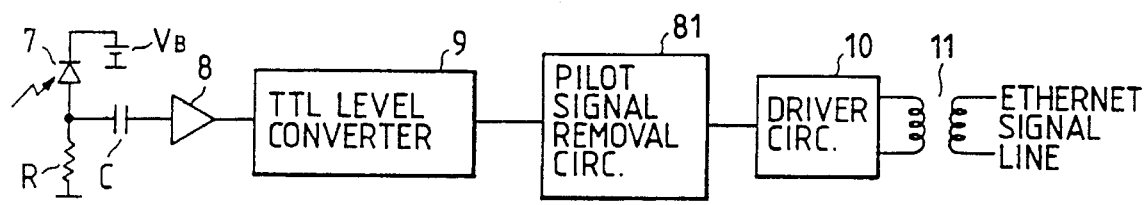

FIG. 6 is a general system block diagram of an embodiment of an optical data T/R apparatus for achieving the above. It is assumed that this apparatus is for wired connection to an Ethernet LAN, however a similar configuration can be used for an opposing optical data T/R apparatus which is connected to a personal computer. Diagram (A) shows the transmitting section and diagram (B) the receiving section of the embodiment. The transmitting section differs from that of the embodiment of FIG. 4(A) by further including a pilot signal insertion circuit 80, which is connected between the data receiver circuit 4 and the LED driver circuit 5. The receiving section differs from that of the embodiment of FIG. 4(B) by further including a pilot signal circuit removal section 81, which is connected between the level converter circuit 9 and the network driver circuit 10.

Figure 7:
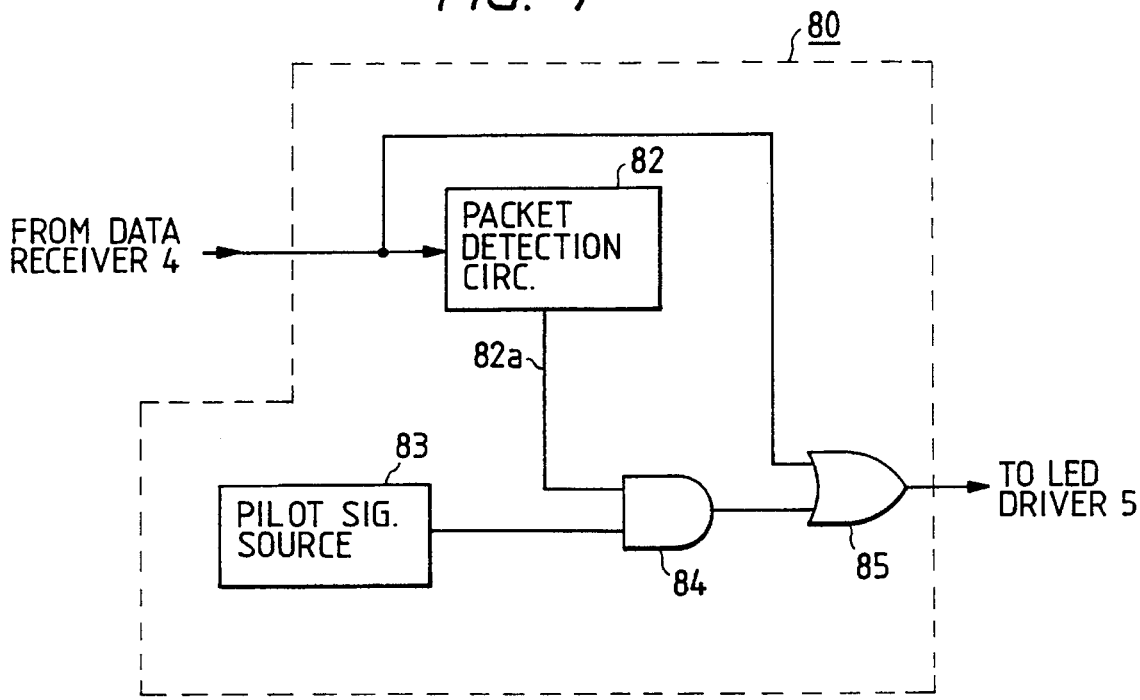
FIG. 7 is a circuit block diagram of a pilot signal insertion circuit in the embodiment of FIG. 6.
Figure 8:
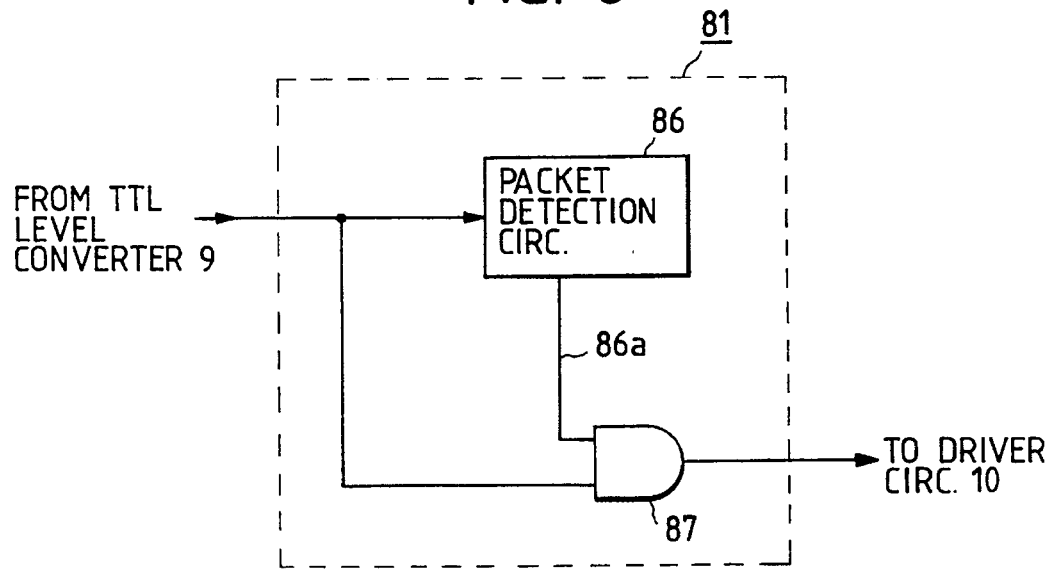
FIG. 8 is a circuit block diagram of a pilot signal removal circuit in the embodiment of FIG. 6.

FIG. 7 shows the basic internal configuration of the pilot signal insertion circuit 80, and FIG. 8 shows that of the pilot signal removal circuit 81. In FIG. 7, the output signal from the receiver circuit 4 is supplied to a packet detection circuit 82, which serves to detect the start code and end code in each data packet of that signal. Based on that detection, the packet detection circuit 82 produces a control signal 82*a* which is at the L (low) logic level during each packet and at the H level during each idle interval between the packets. Since the design of such a circuit would be obvious to a skilled person, detailed description is omitted. The control signal 82*a* is supplied to one input of an AND gate 84, for controlling transfer of a pilot signal to the output of the AND gate. The pilot signal is produced from a pilot signal source 83, and supplied to a second input of AND gate 84. The pilot signal which is thereby outputted from AND gate 84 during each idle interval is supplied to one input of an OR gate 85, and the output signal from the receiver circuit 4 is supplied to the other input of OR gate 85, which thereby produces an output signal of the form shown in diagrams (B) or (C) of FIG. 5, i.e. with the pilot signal inserted into the idle intervals between the data packets.

In FIG. 8, the output signal from the level converter circuit 9 is supplied to one input of an AND gate 87 and to a pilot signal detection circuit 86, which produces a control signal 86*a* that is at the H level during each data packet of the received data signal, and at the L level in each idle interval of that signal. The control signal 86*a* is supplied to the other input of the AND gate 87, which thereby produces an output signal which contains only the data packets conveyed by the received optical signal, with the pilot signal removed.

Another point which must be considered, in the case of an optical wireless data T/R apparatus which is to be mounted in a battery-powered type of portable personal computer is that the power consumption of the optical wireless data T/R apparatus must be made as low as possible. The pilot signal 151 of diagram (B) is formed of successive pulses each having a duration which is as short as possible. With the optical transmitting section shown in diagram (A) of FIG. 4, this ensures that the ON intervals of the LED 6 are made as short as possible, thereby minimizing power consumption for driving the LED 6. However if the ON intervals of the LED 6 are made excessively short, the duration of each H level pulse in the pilot signal portions of the signal received by the optical receiving section may approach the value of time constant of the AGC circuit. If that occurs, then the amplification factor of the receiving circuit will gradually increase during each interval between receiving successive data packets 150, so that the problem of receiver circuit saturation at the initial part of each data packet will not be completely overcome. Furthermore in a practical receiver circuit of an optical receiving section, AC coupling circuit elements are used, so that it is necessary to ensure that the ON/OFF ratio of pulses in the received signal has an appropriate value in relation to the received data rate. For these reasons, in practice it has been found preferable to utilize a pilot signal having a duty factor of approximately 50% and a fixed frequency, as is illustrated by the pilot signal 152 in diagram (C) of FIG. 5. Use of such a pilot signal will minimize the problems which can arise with respect to the time constant of the AGC loop of the receiving circuit, and overshoot in the response of the receiving circuit.

Figure 9:
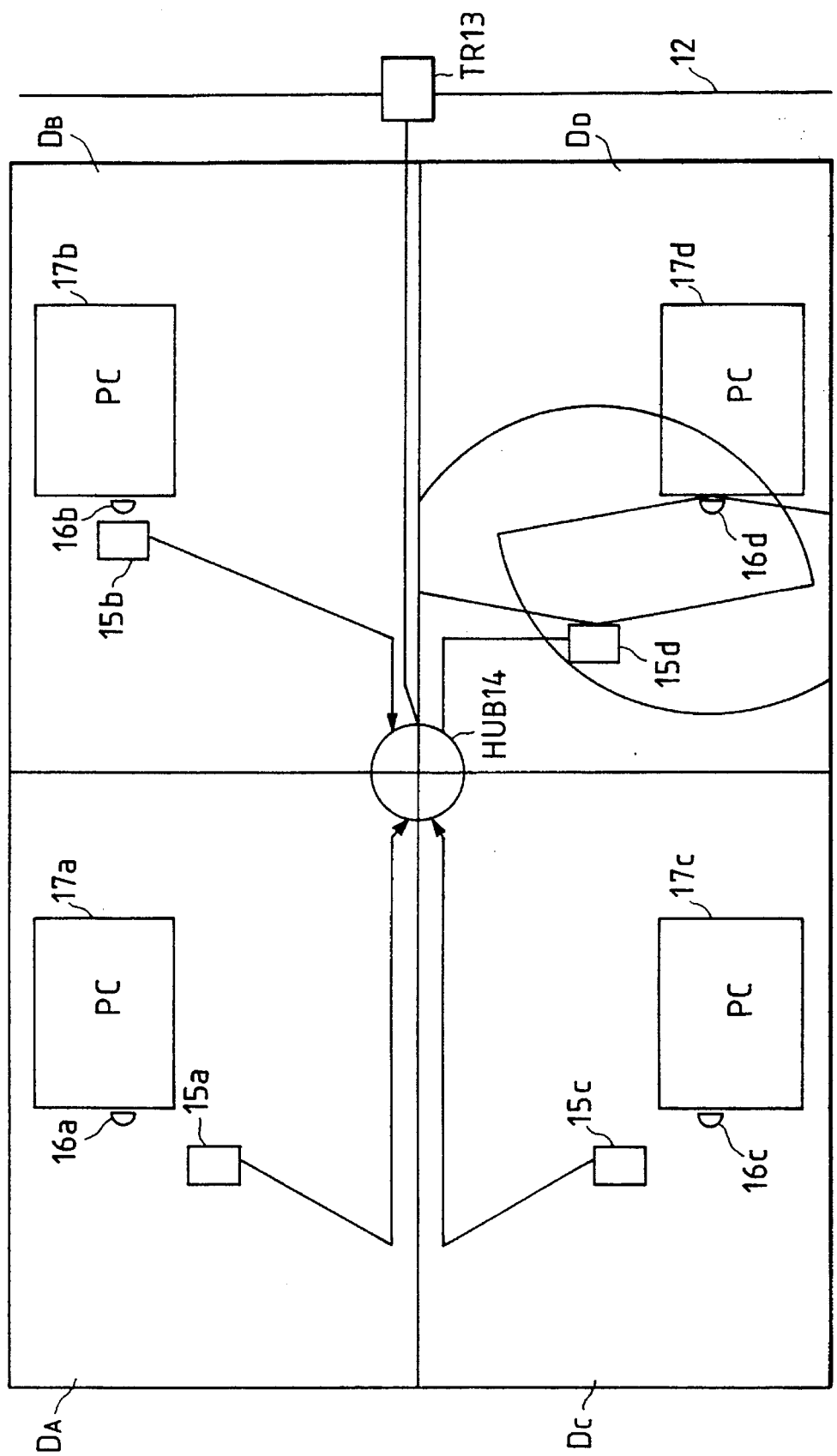
FIG. 9 shows an example of a layout of a wireless optical data transmission system according to the present invention.

An embodiment of an optical wireless data transmission system according to the present invention will be described in the following, having optical wireless data T/R apparatuses each of which can be configured as a combination of an optical transmitting section and optical receiving section of the form shown in diagrams (A) and (B) of FIG. 4, respectively. The embodiment will be assumed to provide data transmission between an Ethernet LAN and a plurality of portable personal computers, and it will be assumed that each of the personal computers is provided with a slot for insertion of a PCMCIA (Personal Computer Memory Card International Association) card. Referring first to FIG. 9, a group of portable personal computers 17*a* to 17*b* are respectively disposed on desks $D_A$ to $D_D$ as shown, and communicate with an Ethernet LAN 12. A T/R apparatus 13 which is part of the LAN 12 is connected for data transmission, by electrical wiring, to a central junction 14 which will be referred to as a hub. A set of four optical T/R apparatuses 15*a* to 15*d* are wire-connected to the hub for data transfer, by respective electrical cables. The optical T/R apparatuses 15*a* to 15*d*, which will be referred to as the first set of optical T/R apparatuses, are placed on respective ones of the desks $D_A$ to $D_D$, and are moveable within a range of movement that is permitted by their respective electrical cables. A data signal (specifically, a Manchester code data signal at a data rate of 10 Mbps) supplied from the optical T/R apparatus 13 of the LAN 12 is converted to an optical signal by E-O conversion in each of the optical T/R apparatuses 15*a* to 15*d*.

Each of the personal computers 17*a* to 17*d* is provided with a corresponding one of a set of optical T/R apparatuses 16*a* to 16*d*, referred to in the following as the second set of optical T/R apparatuses.

When an optical signal is received by one of the optical T/R apparatuses 15*a* to 15*d* or 16*a* to 16*d*, O-E conversion is executed to obtain an electrical signal, so that bidirectional data transmission between any of the the personal computers 17*a* to 17*d* and the LAN 12 is possible. Such O-E conversion is executed as described above with respect to the circuit of diagram (B) of FIG. 4, i.e. direct conversion of an optical signal to obtain a baseband digital signal varying between suitable levels, such as a TTL level signal.

Figure 10:
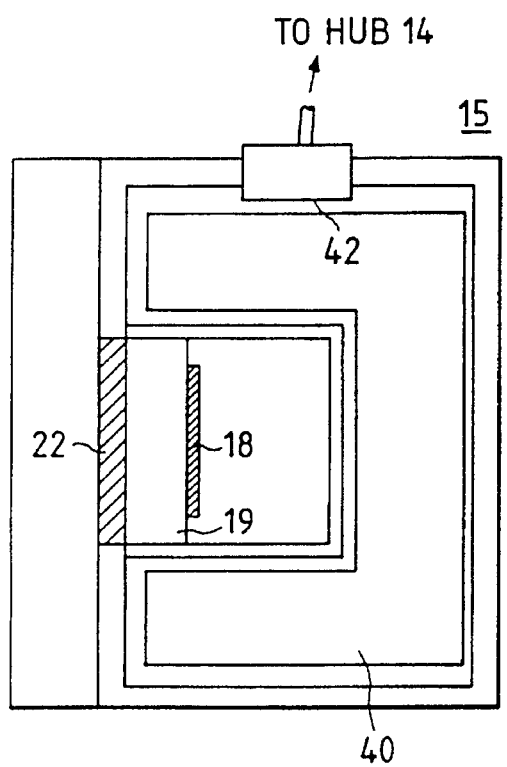
FIGS. 10(A), 10(B) and 10(C) respectively are top, side and front sectional views of a mechanical configuration of an optical transmitting/receiving apparatus according to the present invention, for wired connection to a data communication network.
Figure 10:
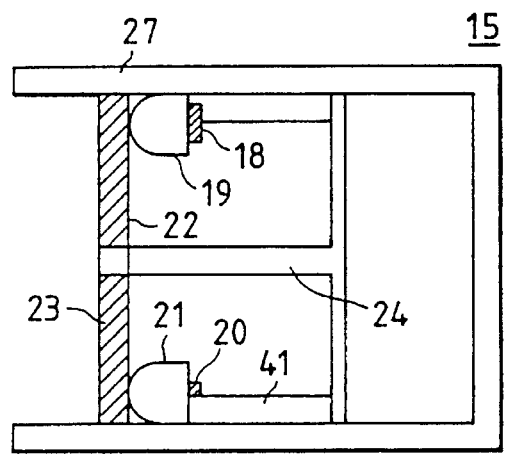
Figure 10:
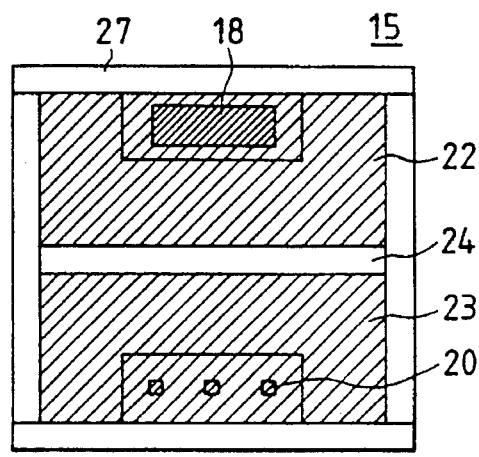

A first example of the mechanical configuration of each of the optical T/R apparatuses 15*a* to 15*d* (referred to as optical T/R apparatus 15) will be described referring to FIG. 10, in which diagrams (A), (B) and (C) respectively show cross-sectional views from above, from the side, and from the front of the optical T/R apparatus 15. In the following, the term "photoreceptive section" will be used to refer to the photoreceptive element(s) together with any associated lens, of an optical T/R apparatus, while the term "photoemissive section" will refer to the photoemissive element(s) together with any associated lens. As shown in FIG. 10, the photoreceptive section of the optical T/R apparatus 15 is disposed as low as possible. As described hereinafter, such an arrangement enables satisfactory transmission and reception to be achieved, irrespective of the height at which each of the optical T/R apparatuses 16*a* to 16*d* is inserted in a slot of the corresponding personal computer. The photoreceptive section of an optical T/R apparatus 15 consists of a photo-diode (such as a PIN photo-diode) having a horizontally elongated shape, and a cylindrical lens 19 which is positioned over the photoreceptive surface of the photodiode 18. The photoemissive section of an optical T/R apparatus 15 consists of three LEDs (light emitting diodes) 20 which are horizontally arrayed, and a cylindrical lens 21 which is disposed over the photo-emissive faces of the LEDs 20. Each of the cylindrical lenses 19, 21 has a longitudonal axis extending in the horizontal direction. Infra-red filters 22 and 23 are respectively disposed over the front surfaces of the cylindrical lenses 19 and 21. The LED drive circuit (corresponding to driver circuit 5 in FIG. 4 above) is formed on a circuit board 41 as shown, while other components of the circuits shown in FIG. 4 are formed on an interface circuit board 40. Connection to an electrical cable, for data transfer to/from the hub 14, is provided by a connector 41.

A partition plate 24 is disposed between the photoreceptive section and photoemissive section of the optical T/R apparatus 15, such as to provide complete mutual optical isolation between these. Due to this optical isolation, any light which is emitted from the LEDs 20 of a hub-side optical T/R apparatus 15 is prevented from reaching (as noise) the photodiode 18 of that optical T/R apparatus 15. As a result, complete bidirectional data communication can be achieved, without interference.

Figure 11:
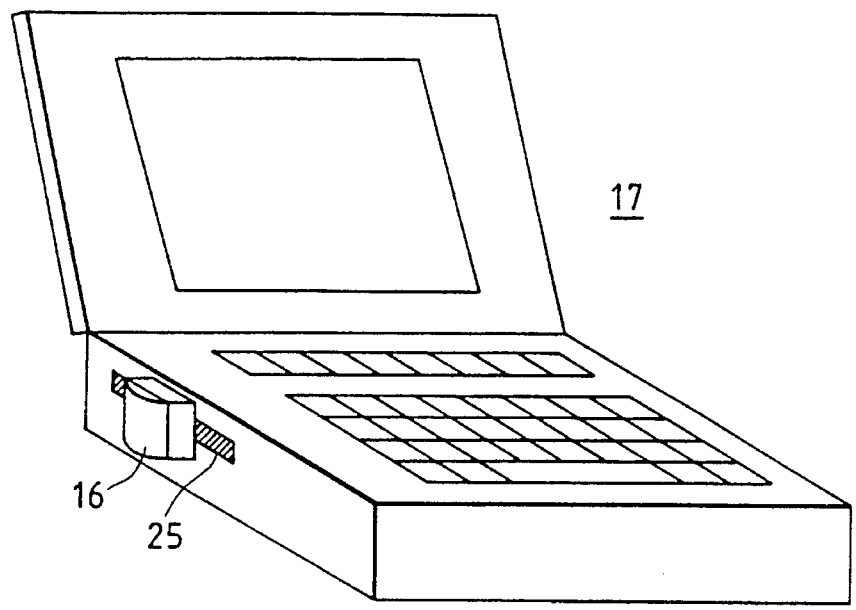
FIG. 11(A) is a diagram a first embodiment of an optical transmitting/receiving apparatus according to the present invention, designed for insertion into a PCMCIA card slot of a personal computer.
FIG. 11(B) is a top cross-sectional view of a PC-side optical T/R apparatus according to the invention.
FIG. 11(C) is a side cross-sectional view of the PC-side optical T/R apparatus formed on a PCMCIA card.
Figure 11:
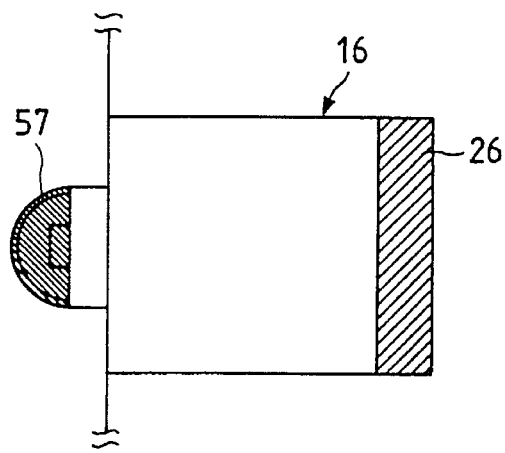
Figure 11:
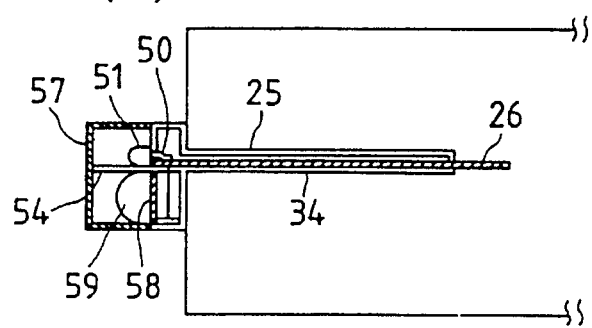

In FIG. 11 diagrams (B) and (C) show a first example of the mechanical configuration of each of the optical T/R apparatuses 16a to 16b (referred to in the following as optical T/R apparatus 16), while diagram (A) shows one of the personal computers 17a to 17b with an optical T/R apparatus 16 mounted therein. Diagram (B) is a cross-sectional view of the PC-side optical T/R apparatus 16 as viewed from above, while (C) is a side cross-sectional view, showing how the PC-side optical T/R apparatus 16 is formed on a PCMCIA card which is inserted in a corresponding slot 25 of the personal computer 17. The PCMCIA card has a main circuit board 34 and a connector 26, which connects to internal circuits of the personal computer 17. As shown in diagram (A), the PC-side optical T/R apparatus 16 is positioned such that the photoemissive section and photoreceptive section both project outside the corresponding personal computer 17, As can be understood from diagram (C) of FIG. 11, the photoemissive section of the PC-side optical T/R apparatus 16 (formed of a LED 50 and a cylindrical lens 51 mounted over the photo-emissive face of the LED 50) is disposed in an upper part of the PC-side optical T/R apparatus 16, while the photoreceptive section (formed of a photodiode 58 and a cylindrical lens 59 mounted over the photo-receptive face of the photodiode 58) is disposed in a lower part of the PC-side optical T/R apparatus 16, with the photoemissive section and photoreceptive section being positioned mutually adacent, but mutually optically isolated by a partition plate plate 54. An IR (infra-red) filter 57 is formed over the front faces of the cylindrical lenses 59 and 51.

A second example of a mechanical configuration for a PC-side optical T/R apparatus 16 will be described referring to FIG. 12, in which diagrams (A), (B) and (C) are respectively a cross-sectional view from above, a side cross-sectional view and a front view of the PC-side optical T/R apparatus 16, in a condition of insertion within a slot 25 of a personal computer 17. With this example, substantially the entire PC-side optical T/R apparatus 16 is formed as a flat body which is substantially entirely contained contained within the slot 25, so that the overall thickness of the optical T/R apparatus 16 must be sufficiently small. As can be seen from the diagrams, the photoemissive and photoreceptive elements of this embodiment are aligned horizontally, in order to minimize the overall thickness of the optical T/R apparatus 16, and these elements are mounted on an edge portion of the flat body, which is exposed to the exterior of the slot 25. As viewed in diagram (C), the the photoemissive element is disposed to the right side and the photoreceptive elements to the left side of the edge portion. The photoemissive section has a pair of chip LEDs 60 as the photoemissive elements, with a cylindrical lens 61 mounted over the photo-emissive faces of the LEDs 60. The photoreceptive section has a photodiode 68 as the photoreceptive element, which is of horizontally elongated shape, and a cylindrical lens 69 mounted over the photo-receptive face of the photodiode 68. These elements of the photoreceptive section and photoemissive section are mutually optically isolated by a partition plate 64 which is disposed between them.

The vertical position relationships between the photoreceptive section and photoemissive section of each PC-side optical T/R apparatus 16 and the corresponding hub-side optical T/R apparatus 15 will be described referring to FIG. 13. The optical T/R apparatus 15 and personal computer 17 containing the optical T/R apparatus 16 are assumed to be set on the same surface, i.e. the top of a desk. It is assumed that the optical T/R apparatus 16 has the mechanical configuration shown in FIG. 12, however the results described are equally applicable to the example of a PC-side optical T/R apparatus 16 shown in FIG. 11. Considering each of the desks $D_A$ to $D_D$ shown in FIG. 9 above, the user can position the hub-side optical T/R apparatus 15 at an arbitrary location which is sufficiently close to the slot 25 of the corresponding personal computer 17. The height of the slot 25 above the desk top will depend upon the particular type of personal computer. However due to the fact that the optical T/R apparatus 15 and the personal computer 17 are supported on the same plane surface, and also due to the fact that the photoemissive section is positioned as high as possible within the optical T/R apparatus 15, it has been found that irrespective of the height of the slot 25 in personal computer 17, satisfactory data communication can be ensured between the hub-side optical T/R apparatus 15 and PC-side optical T/R apparatus 16.

Figure 13:
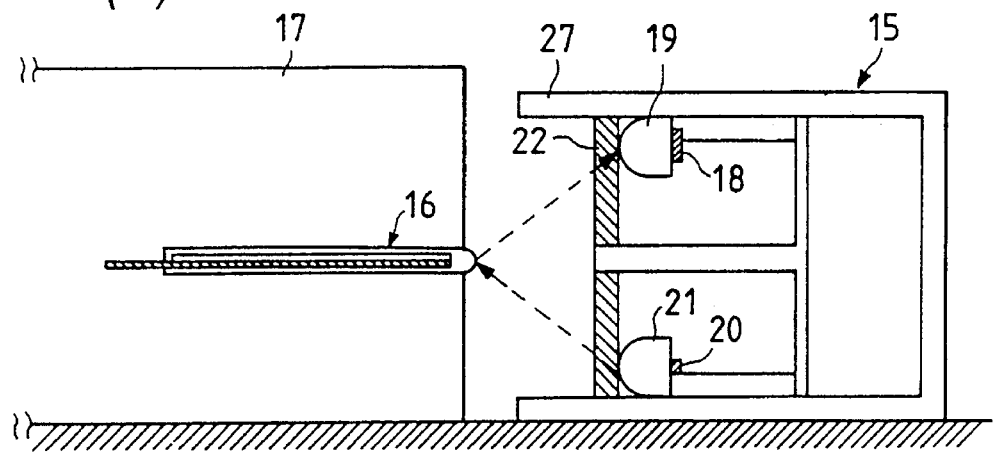
FIGS. 13(A), 13(B) and 13(C) are side cross-sectional views of height relationships between a network-connected optical transmitting/receiving apparatus of the form shown in FIG. 11 and an optical transmitting/receiving apparatus inserted into a personal computer.
Figure 13:
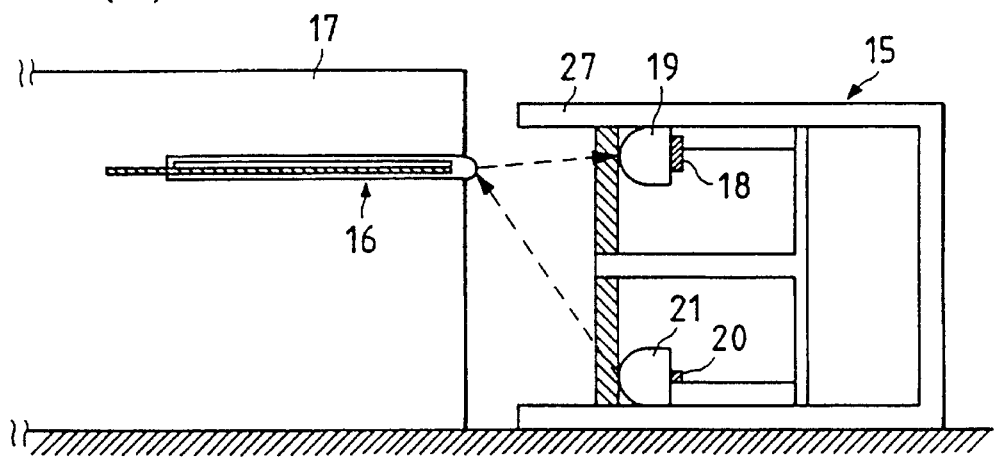
Figure 13:
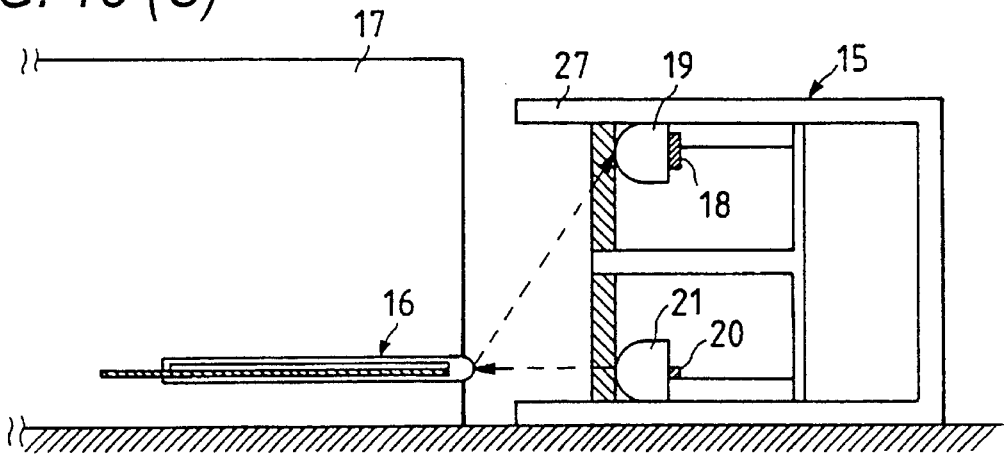

In the example of diagram (A) of FIG. 13, the slot 25 is at a height which is approximately at the center of the overall height of the personal computer 17, whereas in diagram (B) the slot 25 is at a height which is near the top of the hub-side optical T/R apparatus 15, and in diagram (C) the slot 25 is at a height which is near the bottom of the optical T/R apparatus 15.

In order to shield the photodiode 18 from unwanted light, i.e to prevent optical interference from sources such as fluorescent lamps from affecting the photodiode 18 of the optical T/R apparatus 15, as far as possible, and also in order to prevent the user from positioning the photodiode 18 excessively close to the PC-side optical T/R apparatus 16 (in which case the transmission path could become excessively short), the upper face 27 of the outer case of the optical T/R apparatus 15 is formed protruding substantially beyond the front face of the filter 22.

Since a PC-side optical T/R apparatus 16 and the corresponding hub-side optical T/R apparatus 15 are set upon the same desk top, there will not be a substantial difference in vertical position between them. However as can be understood from FIG. 9, there may be considerable differences between their respective horizontal positions, and it can be understood that in some cases the photoemissive section and photoreceptive section of a PC-side optical T/R apparatus 16 may not be positioned directly opposing the photoreceptive section and photoemissive section of the corresponding hub-side optical T/R apparatus 15. For that reason, with the present invention, each optical transmitting section and photoreceptive section is designed to have broad directivity in the horizontal direction and narrow directivity in the vertical direction. In that way the range of relative positions between a PC-side optical T/R apparatus 16 and the corresponding hub-side optical T/R apparatus 15 for which reliable data communication is maintained (that range being referred to as the service area, in the following) is maximized.

Such directivity characteristics are provided by the aforementioned cylindrical lenses which are utilized in each photoemissive section and photoreceptive section.

Arranging the directivity characteristics in that manner has a further advantage, which can be understood if it is assumed that the relationship between the PC-side optical T/R apparatus 16 and hub-side optical T/R apparatus 15 is as shown in diagram (A) of FIG. 13. As the optical T/R apparatus 15 is brought closer to the optical T/R apparatus 16, the angle between the optical T/R apparatus 16 and the upper and lower parts of the optical T/R apparatus 15 (where the photoreceptive section and photoemissive section of the optical T/R apparatus 15 are located) will increase. As a result, there is less of an increase in received signal level (due to received light intensity increasing in accordance with the square law relationship), as the transmission path between the optical T/R apparatus 15 and optical T/R apparatus 16 is decreased, than would occur if the sharp vertical directionality were not established for light transmission and reception. Hence, the level of received light tends to be relatively uniform, in spite of changes in distance between a optical T/R apparatus 15 and the optical T/R apparatus 16, as a result of providing narrow directionality for wireless optical transmission and reception in the vertical direction and broad directionality in the horizontal direction. This serves to further ensure a large service area.

If the optical transmission path between the hub-side optical T/R apparatus 15 and PC-side optical T/R apparatus 16 should move outside the service area, then reliable data communication cannot be achieved, i.e. errors may occur. To avoid such a problem and provide greater convenience to the user, some form of indication can be provided for notifying the user when such a condition has occurred. The indication can be either visible (e.g. a warning lamp) or audible (e.g. a buzzer sound), or a combination of both audible and visible indications. In that case, the user can move the optical T/R apparatus 15 or the personal computer 17 until the optical transmission path comes within the service area.

A facility for providing such a warning indication can be provided either on the apparatus 16 or the optical T/R apparatus 15. However since in general the PC-side optical T/R apparatus 16 will be powered from a battery which powers the personal computer 17, and it is desirable to minimize battery power consumption as far as possible, it is preferable to provide the warning indication facility on the hub-side optical T/R apparatus 15.

Figure 14:
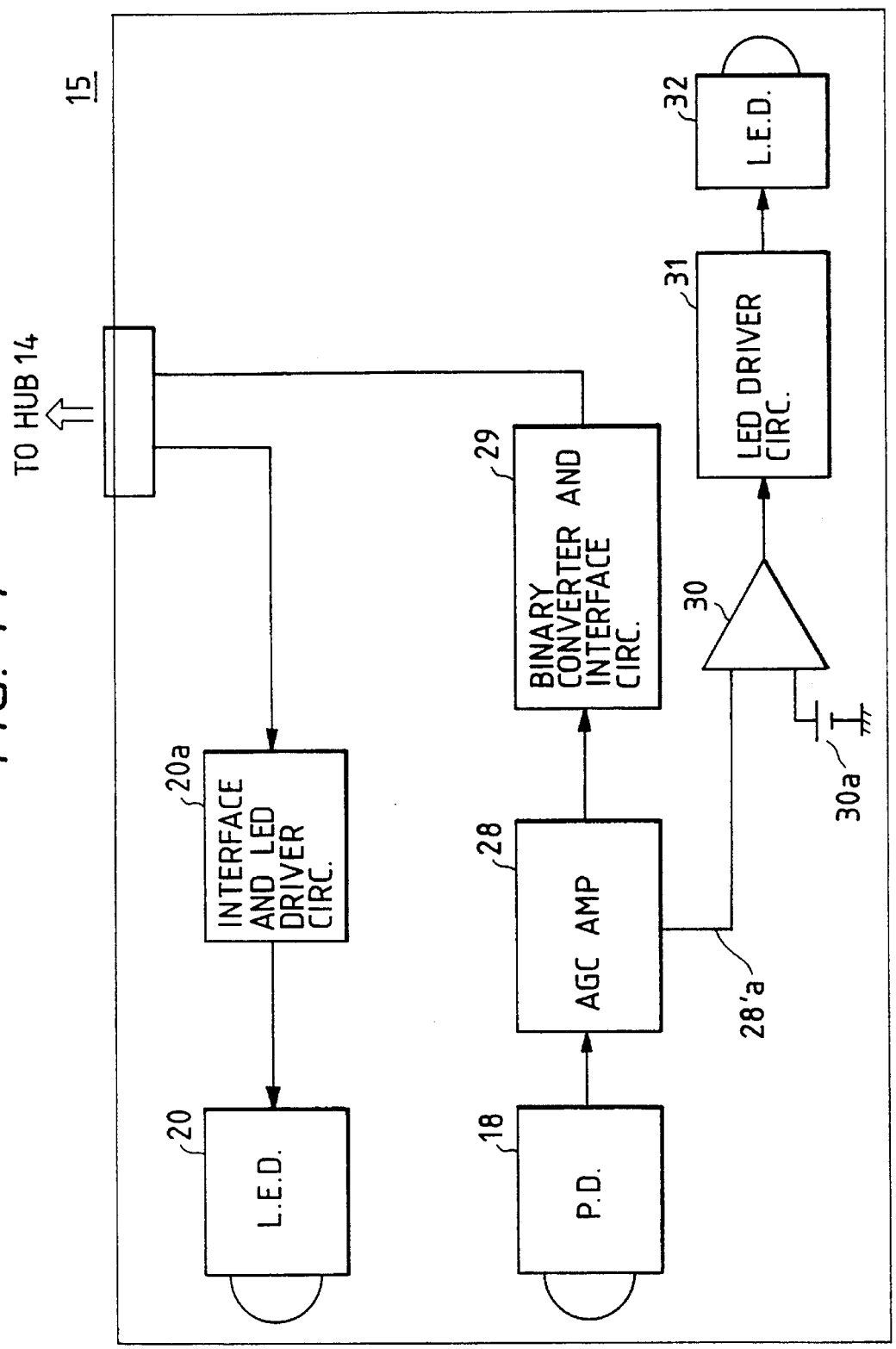
FIG. 14 is a circuit diagram of an optical transmitting/receiving apparatus which is provided with a display device for providing a warning indication relating to a data transmission path.

FIG. 14 is a general system block diagram of a optical T/R apparatus 15, provided with such a warning indication facility. It will be assumed in the following that the warning indication device is a LED, i.e. a visible warning is emitted, however it would be equally possible to utilize a buzzer for that purpose. In FIG. 14, 20a denotes a circuit section containing an interface circuit and a drive amplifier for a LED 20, while 29 denotes a binary converter and interface circuit for transferring data via the hub 14 to the LAN. The output signal from a photodiode 18, i.e. the received data signal, is supplied to an AGC amplifier 28, which produces an AGC voltage on a line 28a. The AGC voltage varies in level in accordance with the received signal level, and is supplied to one input of a comparator 30, while a fixed threshold voltage is applied to the other input of the comparator 30. The output of the comparator 30 is supplied to a LED driver circuit 31, to drive a LED 32. The input connections to the comparator 30 are configured such that when the AGC voltage falls below a certain value, corresponding to a fall in the received optical signal level below a predetermined value which is known to be sufficient for reliable data communication, the output voltage from the comparator 30 goes from a low to a high level, thereby causing the LED 32 to be driven to the light-emitting state.

It would be equally possible to provide an opposite type of warning indication, i.e. to drive the LED to the ON state only so long as the AGC voltage is above the value that is indicative of satisfactory received signal level. In that case the user would be warned that the transmission path is outside the service area when the LED 32 ceases to emit light.

Various other modification could also be envisaged. For example, it would be possible to arrange to drive the LED 32 at a certain intermediate level of current if the received optical signal level (as indicated by the AGC voltage value) is in an intermediate range between the level at which data reception is only just possible and the level at which satisfactory reception begins, and to to drive the LED 32 at full current when the received signal level is above that range. The invention is not limited to such methods of warning indication, however. For example, the LED could be driven to repetitively flash on and off, when the received signal level is in the aforementioned intermediate range.

As mentioned above, it would be equally possible to use a warning device such as a buzzer, instead of a LED, as the warning device.

The aforementioned pilot signal, described above referring to FIGS. 6 to 8, can be utilized for providing a warning indication to the user of a personal computer 17 that the personal computer is outside the service area with respect to the corresponding hub-side optical T/R apparatus 15. With such an arrangement, the optical T/R apparatus 16 of a personal computer 17 only inserts the pilot signal into its transmitted optical signal when the optical T/R apparatus 16 is receiving the pilot signal as an optical signal transmitted from the corresponding hub-side optical T/R apparatus 15, at a sufficient level of reception. If that optical T/R apparatus 15 does not receive the pilot signal from the optical T/R apparatus 16, then the optical T/R apparatus 15 drives a warning device such as a LED or buzzer, as an indication to the user of optical T/R apparatus 16 that a satisfactory optical transmission path is not established. Alternatively, the optical T/R apparatus 15 could drive an LED to provide a confirmation indication, so long as the optical T/R apparatus 15 is receiving from the corresponding PC-side optical T/R apparatus 16 an optical signal containing the pilot signal.

Figure 15:
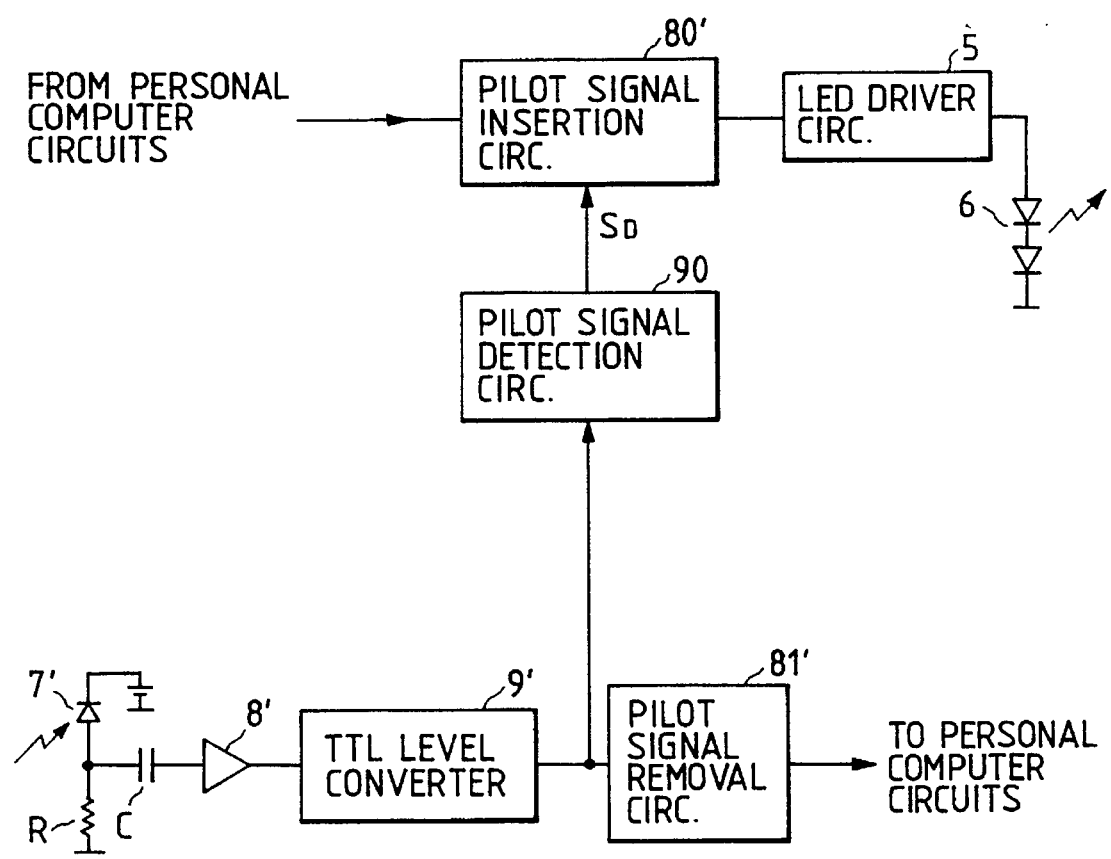
FIG. 15 is a system block diagram of an optical transmitting/receiving apparatus for insertion into a personal computer, for a transmission system providing a warning indication based on reception of a pilot signal.

A specific embodiment for providing such a warning indication will be described referring to FIGS. 15 to 17. The circuits are modifications of those shown in FIGS. 6 and 7 above, with corresponding circuit components being designated by identical reference numerals to those of FIGS. 6, 7. FIG. 15 shows the general circuit configuration of a PC-side optical T/R apparatus 16 of this embodiment. In the optical transmitting section, an output data signal from the circuits of the personal computer is supplied to an pilot signal insertion circuit 80', whose output signal is supplied to a LED driver circuit 5, to drive the LED 6. In the optical receiving section, the received data signal, produced from an input amplifier 8', is converted to a TTL level signal in a TTL level converter circuit 9', and that signal is supplied to a pilot signal removal circuit 81'. The resultant output data signal is supplied to the circuits of the personal computer. The output signal from the TTL level converter circuit 9' is also supplied to a pilot signal detection circuit 90, which detects whether a pilot signal is present, at a sufficient level, in the optical signal that is received by the receiving section. The pilot signal detection circuit 90 produces a control signal $S_D$ at either the H or L logic level in accordance with whether or not the pilot signal is detected. That control signal $S_D$ is applied to control the pilot signal insertion circuit 80', such as to selectively enable or inhibit insertion of the pilot signal into the output optical signal produced by the transmitting section, in accordance with whether or not the pilot signal is being correctly detected in the optical signal that is received by the receiving section.

The pilot signal detection circuit 90 can for example consist of a bandpass filter having its center frequency at the pilot signal frequency, a circuit for detecting the level of output signal from that filter, and a comparator for determining whether or not that signal level is above a predetermined threshold. Design of such a circuit will be obvious to a skilled person, so that detailed description is omitted. It would also be possible to include a timer feature, whereby insertion of the pilot signal by the pilot signal insertion circuit 80' is inhibited only if the presence of the pilot signal in the received optical signal has not been detected for more than a specific time interval.

Figure 16:
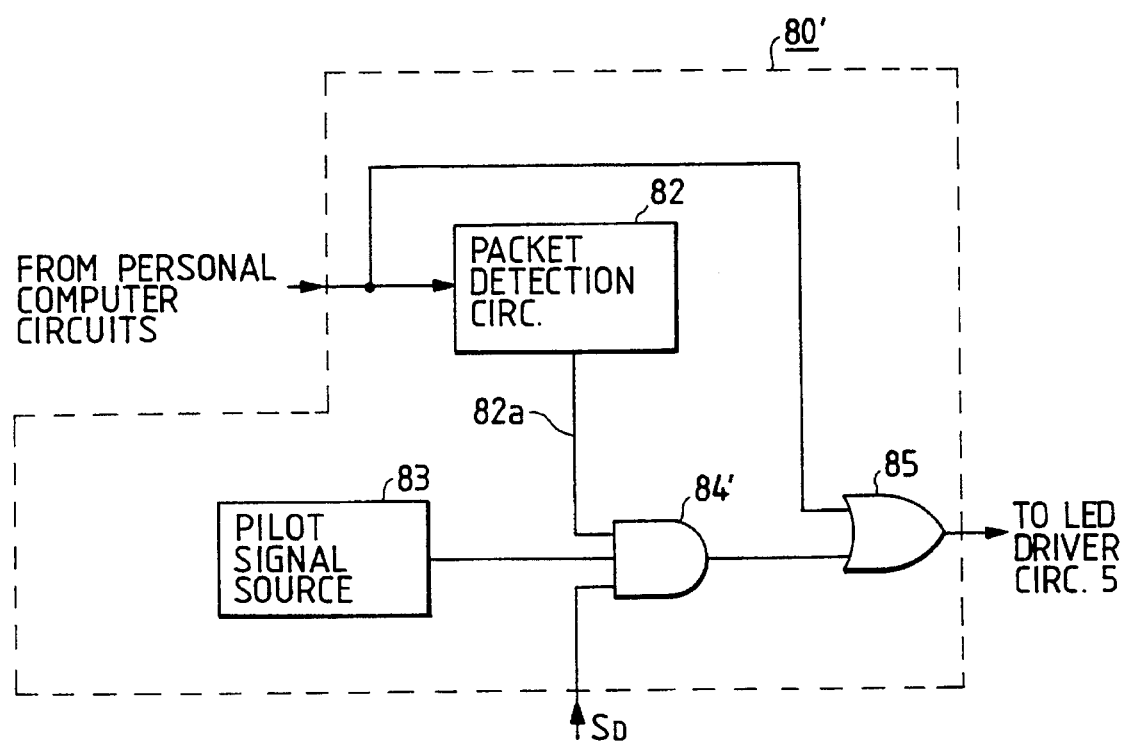
FIG. 16 is a circuit block diagram of a pilot signal insertion circuit in the embodiment of FIG. 15.

The pilot signal insertion circuit 80' of this embodiment can for example be configured as shown in FIG. 16, which is a modification of the circuit of FIG. 7 described above. In this case, an AND gate 84' is controlled by the control signal $S_D$ such as to inhibit insertion of the pilot signal into the output signal from the circuit, if the signal $S_D$ is at the L level.

Figure 17:
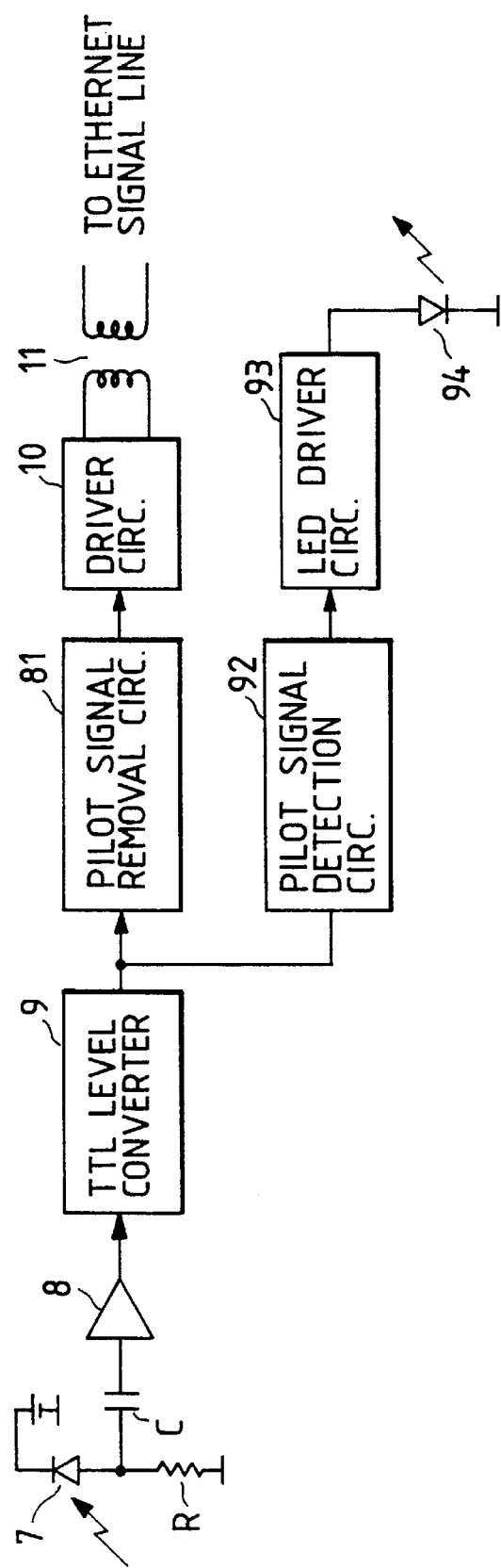
FIG. 17 is a system block diagram of an embodiment of a transmitting section of an optical transmitting/receiving apparatus for wired connection to a network, for use with the optical transmitting/receiving apparatus of FIG. 15.

FIG. 17 illustrates how the receiving section of a hub-side optical T/R apparatus 15 of the form shown in FIG. 6 described above can be modified, to provide a visible indication that a pilot signal is not detected in the received optical signal that has been transmitted by a PC-side optical T/R apparatus 16 that is of the form shown in FIG. 15. The output data signal from the TTL level converter circuit 9 is supplied to a pilot signal detection circuit 92, whose output signal varies in accordance with whether or not a pilot signal of sufficient level is detected in the received optical signal. That output signal is supplied to a LED driver circuit 93, to drive a LED, and thereby provide a visible indication as to whether or not a satisfactory transmission path is established between that optical T/R apparatus 15 and the corresponding PC-side optical T/R apparatus 16.

It would of course be equally possible to modify the circuit of FIG. 17 to provide an audible indication when a satisfactory transmission path is not established, for example by driving a buzzer rather than a LED.

Such a system has the advantage that each PC-side optical T/R apparatus 16 only drives its LEDs to emit the pilot signal as an optical signal so long as an optical signal containing the pilot signal continues to be received from the corresponding hub-side optical T/R apparatus 15. A reduction can thereby be achieved in the power consumption of each optical T/R apparatus 16, thereby reducing the power drain on the battery of the corresponding personal computer 17.

Figure 18:
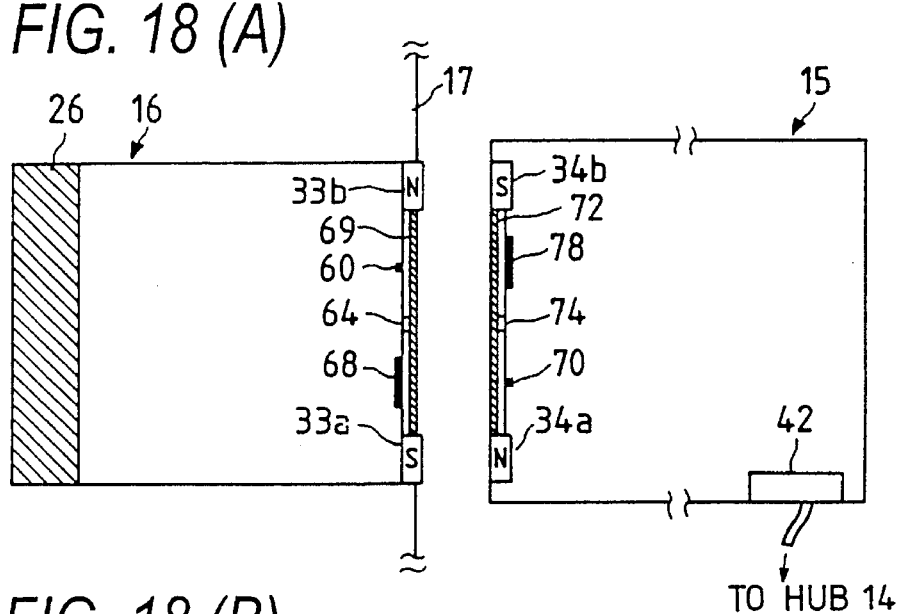
FIGS. 18(A), 18(B) and 18(C) are top and side cross-sectional views and front view, respectively, of a second embodiment of an optical transmitting/receiving apparatus for wired connection to a network and a third embodiment of an optical transmitting/receiving apparatus for insertion into a personal computer, provided with attachment magnets.
Figure 18:
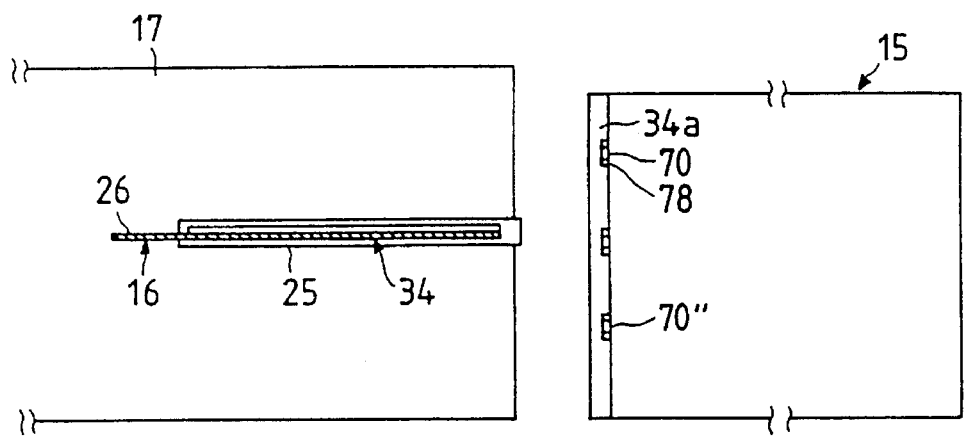
Figure 18:
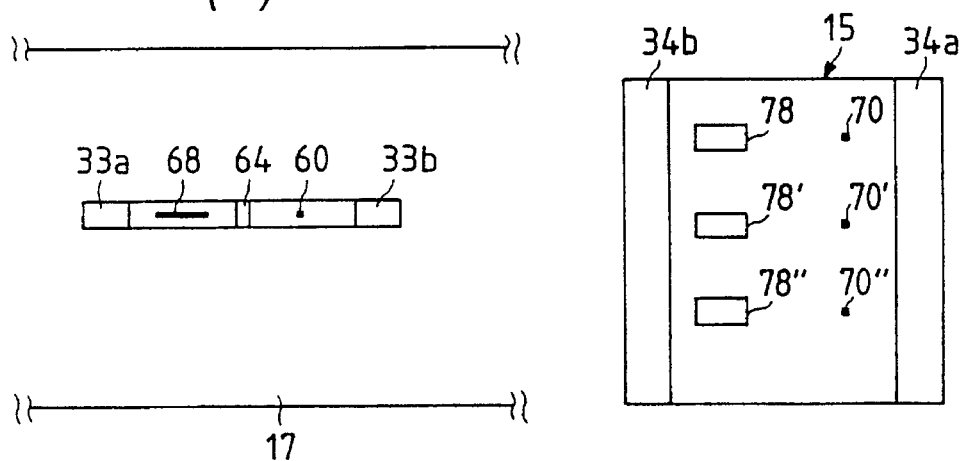

Another embodiment of an optical wireless data T/R apparatus according to the invention will be described referring to FIG. 18. With the embodiments described above, since each hub-side optical T/R apparatus 15 and the corresponding personal computer 17 are movable with respect to each other, and are spaced apart by some distance, there is always a possibility that the transmission path between them may be interrupted. This could be caused by movement of the optical T/R apparatus 15 or personal computer 17 outside the service area, or by an object being accidentally interposed in the transmission path. Arrangements have therefore been described above whereby the user is notified when such an interruption of the transmission path exists. However with the embodiment of FIG. 18, the transmission path is always held securely established, so that there is no need to provide any warning indication device. In FIG. 18, diagram (A) is a cross-sectional view from above of a hub-side optical T/R apparatus 15 and of the corresponding PC-side optical T/R apparatus 16 mounted within a personal computer 17, diagram (B) is a corresponding side cross-sectional view, and diagram (C) is a front view. With this embodiment, the optical T/R apparatus 16 is of thin flat shape, designed to be accomodated within a slot 25 of the personal computer 17, as for the embodiment of FIG. 12 described above, having a horizontally elongated photodiode 18 and a chip LED 60 which are mutually separated by a partition member 64, with an IR filter 69 disposed over the front faces of the photodiode 18 and LED 60, and with the photodiode 18 and LED 60 being disposed horizontally opposing at left and right sides of the optical T/R apparatus 16. However in this case, no cylindrical lenses are provided on the optical T/R apparatuses 15 and 16. The optical T/R apparatus 16 is provided with a pair of permanent magnets 33a, 33b (referred to in the following as the first magnets) which are fixedly mounted on the optical T/R apparatus 16 such as to protrude slightly outward from the slot 25. As shown in diagram (A), the magnets 33a, 33b are disposed horizontally opposing at respectively opposite sides of the optical T/R apparatus 16. The optical T/R apparatus 15 is provided with a pair of magnets 34a, 34b, which are preferably permanent magnets, and which are each of elongated form and are fixedly mounted on opposing sides of the front face of the optical T/R apparatus 15, each extending in the vertical direction from the top to bottom of the optical T/R apparatus 15, as can be understood from diagram (C) of FIG. 18. The magnets 34a, 34b have respectively opposite polarities to the magnets 33a, 33b.

The optical T/R apparatus 15 is further provided with a set of three photodiodes 78, 78' and 78" and a corresponding set of three LEDs 70, 70' and 70" each set arrayed vertically on the front face of the optical T/R apparatus 15 as illustrated in diagram (C) of FIG. 18, to form three horizontally opposing photodiode/LED pairs (78 and 70, 78' and 70', 78" and 70") at three respectively different heights on the front face of the optical T/R apparatus 15, i.e. the three photodiode/LED pairs are respectively disposed at an upper, a middle, and a lower position on the front face of the optical T/R apparatus 15. In each of these photodiode/LED pairs, the horizontal position relationship between the photodiode and LED is identical to that of the photodiode 68 and LED 60 of the optical T/R apparatus 16.

With this embodiment, to establish a data transmission path, the user brings the front face of the hub-side optical T/R apparatus 15 close to the PC-side optical T/R apparatus 16 (mounted in the slot 25 of the personal computer 17), so that the optical T/R apparatus 15 becomes held in contact with the optical T/R apparatus 16. The height at which the optical T/R apparatus 16 is positioned will vary in accordance with the particular type of personal computer 17. However since there are three possible optimum height positions determined by the three photodiode/LED pairs of the optical T/R apparatus 15, it is ensured that the photodiode 68 and LED 60 of the optical T/R apparatus 16 can always be set in close proximity to an LED and photodiode, respectively, of one of the LED/photodiode pairs of the optical T/R apparatus 15. Furthermore, after bringing the optical T/R apparatus 15 and the optical T/R apparatus 16 together, it is of course possible for the user to slide the optical T/R apparatus 15 in the vertical direction, relative to the optical T/R apparatus 16, to set the optical T/R apparatus 15 at an optimum position for data transmission.

With this embodiment, the hub-side optical T/R apparatus 15 and PC-side optical T/R apparatus 16 are held in close physical contact by the attraction force between the magnets 33a, 33b, 34a, 34b. Thus, once the transmission path has been established between them, the transmission path will be securely maintained, i.e. there is no danger of accidental movement of the optical T/R apparatus 15 or the personal computer 17 (or interposition of an object between them) causing the transmission path to be interrupted, as is possible with the preceding embodiments. Such a type of coupling has advantages over a removable electrical connection arrangement, i.e. a plug and socket connection. Firstly, with this embodiment, there is no possibility of unreliability due to mechanical wear or damage, which can occur as a result of repeatedly connecting and disconnecting an electrical plug to/from a socket. Secondly, the problem of unreliability due to poor electrical connection (e.g. because of contact surface wear or corrosion) is avoided. Thirdly, there is greater convenience to the user, since the transmission path can be very easily set up.

Figure 12:
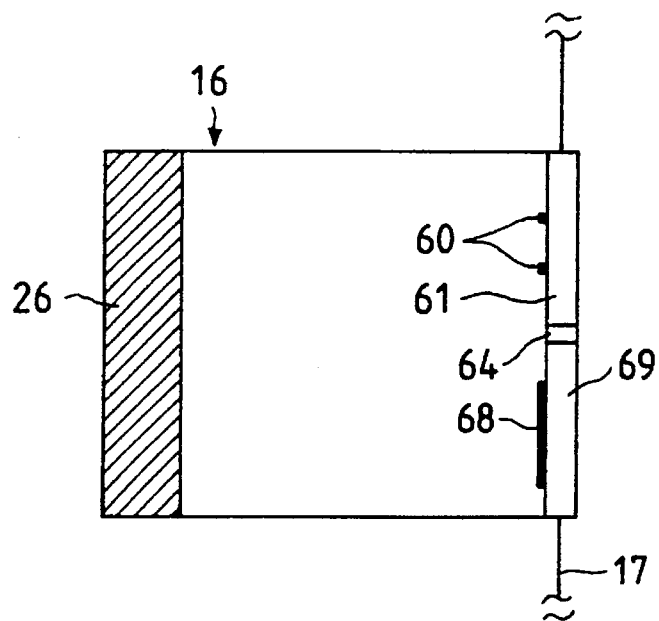
FIGS. 12(A), 12(B) are top and side and cross-sectional views, respectively.
FIG. 12(C) is a front view of a second embodiment of an optical transmitting/receiving apparatus according to the present invention, designed for insertion into a PCMCIA card slot of a personal computer.
Figure 12:
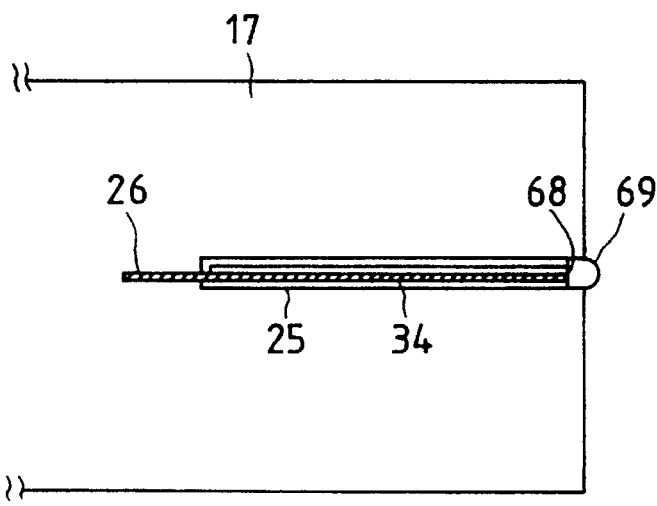
Figure 12:
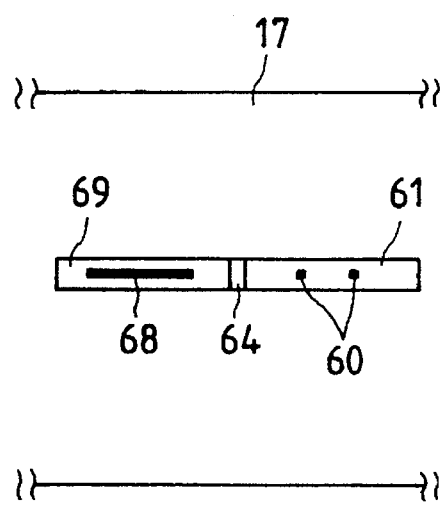
Figure 19:
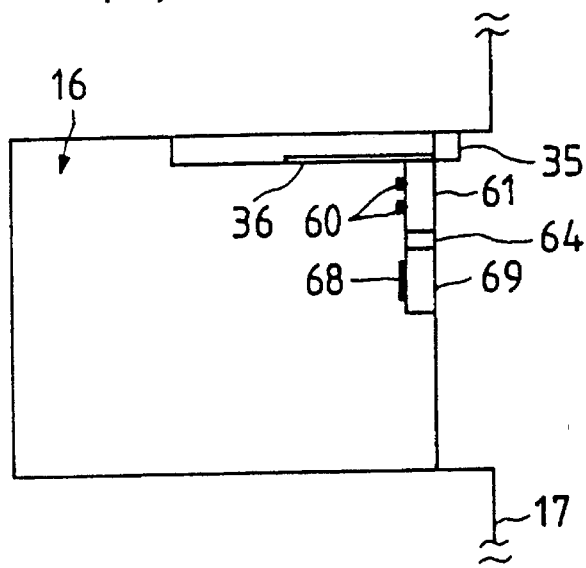
Figure 19:
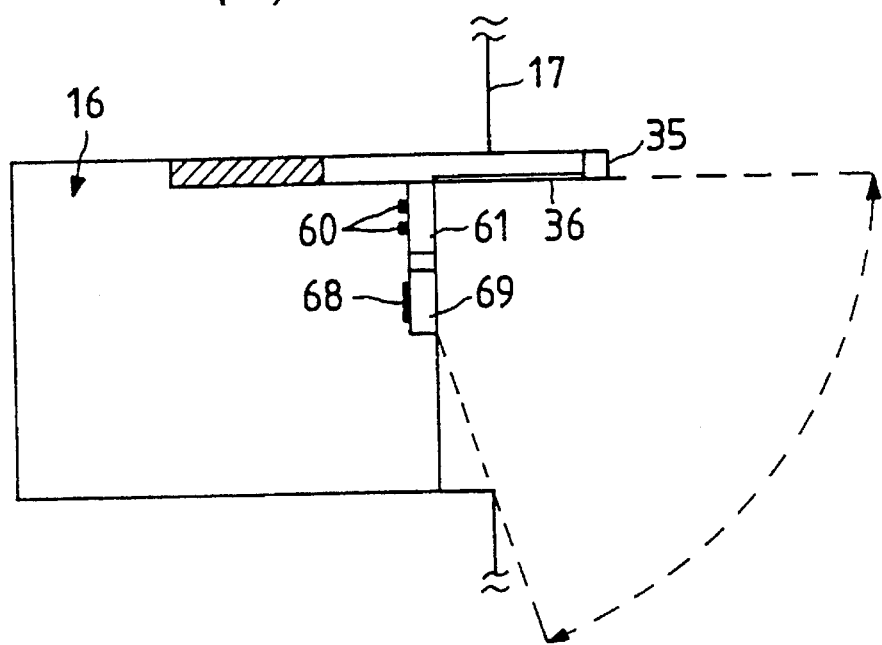

With the embodiments of FIGS. 11 to 13 above, to maximize the size of the service area, the optical receiving and transmitting sections of the PC-side optical T/R apparatus 16 preferably protrude outward to some extent from the slot 25 of the personal computer 17. However in that case, problems can arise such as damage to the optical T/R apparatus 16 if the personal computer 17 is carried or stored in a condition in which the PC-side optical T/R apparatus 16 is partially protruding out from the slot 25. For that reason, two other embodiments of an optical wireless data optical T/R apparatus according to the invention will be described whereby the PC-side optical T/R apparatus 16 can be contained entirely within the slot 25 of the personal computer 17, for the purposes of transportation or storage, and can be set in an outwardly protruding condition to thereby increase the size of the service area when required. FIG. 19 shows one such embodiment, with diagram (A) showing the optical T/R apparatus 16 set in a condition for transporting or storing the personal computer 17, and diagram (B) showing the optical T/R apparatus 16 set in an operating condition. The optical T/R apparatus 16 is assumed to be configured as in the embodiment of FIG. 12 above, other than that the optical T/R apparatus 16 is configured to be entirely contained within the slot 25 of the personal computer 17, and is provided with a slide member 35. The slide member 35 is movably mounted on one side of the optical T/R apparatus 16, such as to be capable of being set inside the slot 25 as shown in diagram (A), or of being pulled horizontally outward to protrude from the slot as shown in diagram (B). A mirror 36 is formed on the vertical surface of the slide member 35 that is adjacent to the photoreceptive and photoemissive sections of the optical T/R apparatus 16. Thus, with the slide member 35 in the outward position, the service area is increased in the horizontal direction, as a result of received or transmitted light being reflected by the mirror 36.

Figure 20:
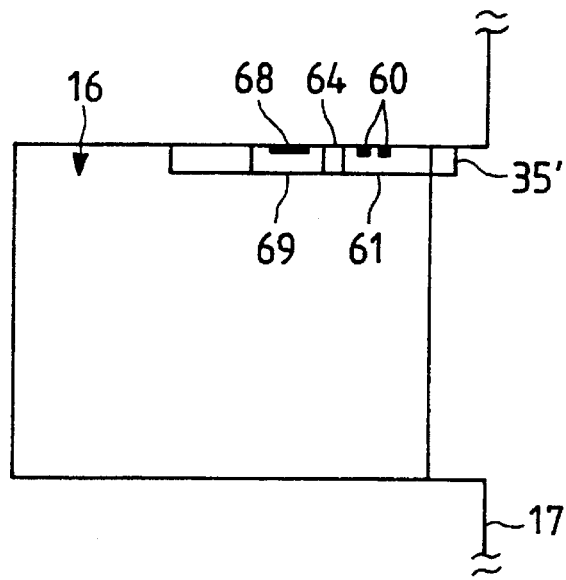
FIGS. 20(A) and 20(B) are diagrams of shows a fifth embodiment of an optical transmitting/receiving apparatus for insertion into a personal computer, provided with an extendable member which supports photo-receptive and photo-emissive elements.
Figure 20:
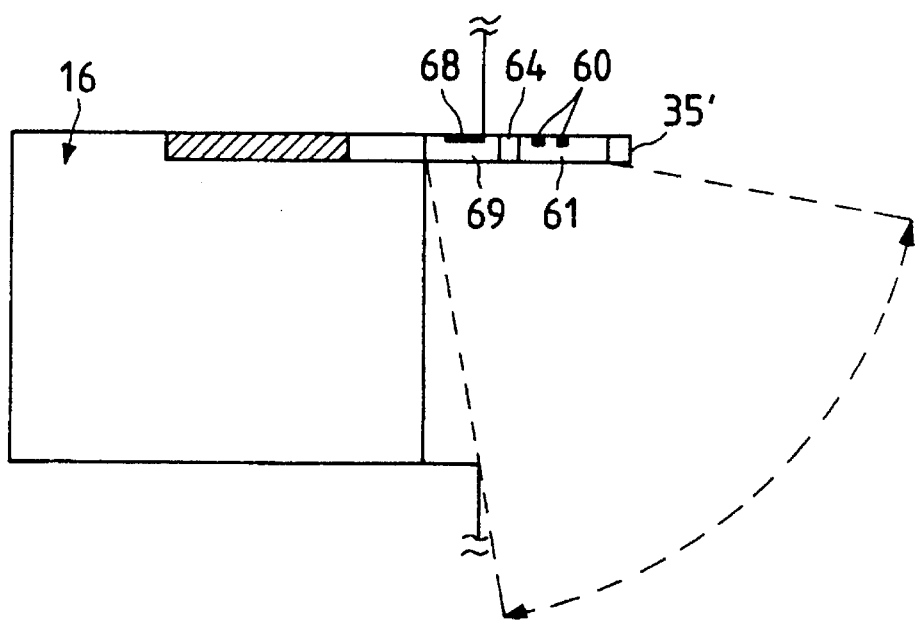

Another embodiment of the invention which provides similar effects to that of FIG. 19 will be described referring to FIG. 20. With this embodiment, the photoreceptive and photoemissive sections of the optical T/R apparatus 16 are mounted on a slide member 35', which is mounted on the optical T/R apparatus 16 in a similar manner to that of the slide member 35 of the preceding embodiment. As a result, the slide member 35' can be set entirely within the slot 25, for storage or transportation of the personal computer 17 as shown in diagram (A), whereas when the slide member 35' is pulled by the user to the outward position illustrated in diagram (B), the photoreceptive and photoemissive sections are made to protrude substantially outside the slot 25 of the personal computer 17. Thus, a large service area can be ensured.

Figure 21:
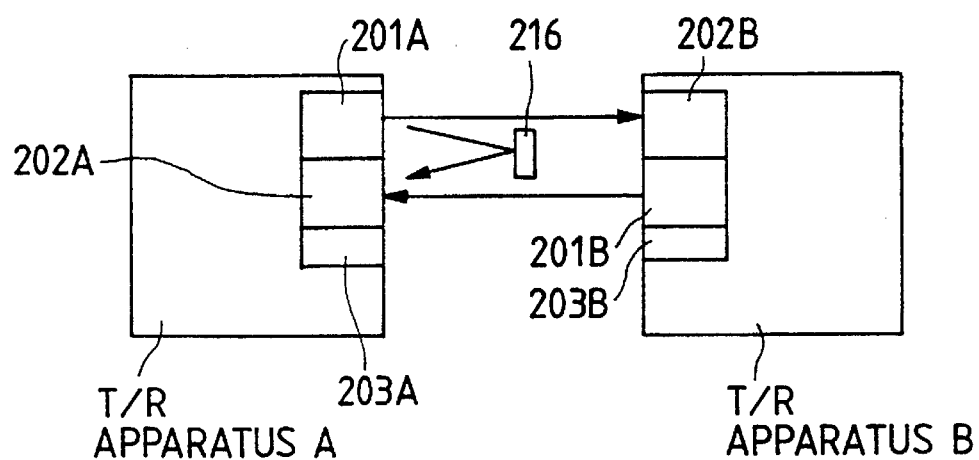
FIG. 21 is a diagram for describing an optical wireless data transmission system having a pair of opposing optical data transmitting/receiving apparatuses, each provided with a return light cancellation section.

In the above description of embodiments of the invention, it has been assumed that the only light which will fall upon the photoreceptive section of an optical wireless data T/R apparatus will be either light emitted from the photoemissive section of a corresponding optical wireless data T/R apparatus, or room light such as artificial illumination. That is to say, it has been assumed that each photoreceptive section of each optical T/R apparatus is sufficiently optically isolated from self-transmitted light. However in practice, a part of the light emitted from an optical transmitting section may be reflected back (for example by some object that is within the service area) to the photoreceptive section of that optical T/R apparatus. This will result in an inteference signal component being introduced into the received optical signal. Embodiments of the invention will now be described whereby that problem can be effectively overcome. The basic principles of these embodiments are illustrated in FIG. 21, in which a first optical wireless data T/R apparatus referred to as optical T/R apparatus A has an optical transmitting section 201A and an optical receiving section 202A, while an opposing optical wireless data T/R apparatus referred to as optical T/R apparatus B has an optical transmitting section 201B and an optical receiving section 202B. A part of the light emitted from the optical transmitting section 201A is reflected back to the optical receiving section 202A. However the optical T/R apparatus A is provided with a circuit which will be referred to as a return light cancellation section 203A, which functions as described hereinafter to eliminate the effects of the back-reflected light from the received data signal. The optical T/R apparatus B is similarly provided with a return light cancellation section 203B.

Figure 23:
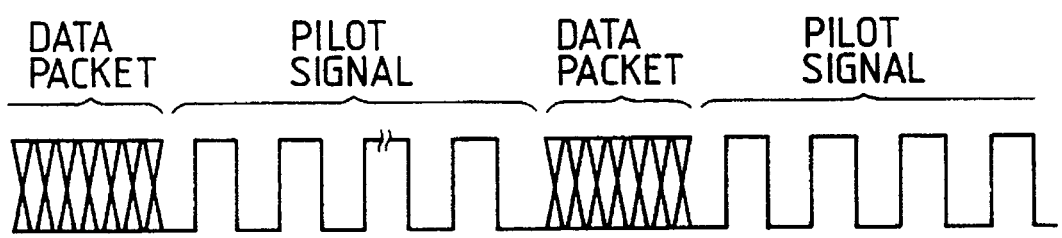
FIG. 23 is a timing diagram for describing a pilot signal used in the embodiment of FIG. 22.

A first embodiment of such an optical wireless T/R apparatus will be described referring to FIG. 22, which shows the internal configuration of the optical T/R apparatus A of FIG. 21. The optical T/R apparatus B of FIG. 21 has a similar internal configuration. The optical transmitting section 201A is shown as basically consisting of an interface circuit 231A together with a LED drive circuit 208A and a LED 207A, however the optical transmitting section 201A can be configured as described hereinabove for any of the preceding embodiments, but with the addition of the interface circuit 231A. The interface circuit 231A is electrically connected to receive an input data signal consisting of successive packets (e.g. from a personal computer or from a LAN), and inserts a pilot signal into each of the idle intervals between successive packets, to obtain a transmission signal S1. The internal configuration of the interface circuit 231A can be similar to that of the pilot signal insertion section 80 of the embodiment of FIG. 6, shown in FIG. 7 and described hereinabove, so that detailed description will be omitted. The transmission signal S1 is supplied to the driver circuit 208A, to intensity-modulate light which is emitted from the LED 207A. The pilot signal is a fixed-frequency signal whose relationship to the data packets is as illustrated in FIG. 23. As shown, this can be similar to the pilot signal utilized to ensure satisfactory AGC control operation, described hereinabove referring to FIG. 5. However with the embodiment of FIG. 22, it is essential that respectively different frequencies of pilot signal be used in the optical transmitting sections of the optical T/R apparatuses A and B.

The optical receiving section 202A includes an input amplifier 210A which amplifies a detection signal derived by the photodiode 209A from a received optical signal, and supplies a resultant signal (referred to in the following as the reception signal S2) to one input of an adder 211A. A cancellation signal S7 (generated as described hereinafter) is applied to the other input of the adder 211A, and the resultant output signal from the adder is supplied to a second amplifier 212A. The amplified output signal from the amplifier 212A is supplied to a binary converter 232A to be converted to a binary signal (e.g. a TTL level signal), which is supplied to an interface circuit 233A. The interface circuit 233A extracts only the received data packets from that binary signal, and outputs these, omitting the pilot signal portions. The internal configuration of the interface circuit 233A can be similar to that shown in FIG. 8 and described hereinabove, so that detailed description will be omitted.

The output signal from the amplifier 212A is also supplied to a bandpass filter 222A of the return light cancellation section 203A. The return light cancellation section 203A further includes an amplifier 225A, a binary converter 226A, a D-type flip-flop (D-FF) 223A, a voltage-controlled switch 234A, a low-pass filter circuit made up of a resistor 227A and capacitor 228A, a voltage controlled attenuator 218A, an inverter 219A, and a phase adjustment circuit 217A.

The basic principles of operation of this embodiment are as follows. The transmission signal S1 is branched to the return light cancellation section 203A and is adjusted in phase by the phase adjustment circuit 217A by a fixed amount, such as to be substantially exactly in phase with any received unwanted pilot signal component that results from back-reflected light and is present in the reception signal. The output signal from the phase adjustment circuit 217A, referred to in the following as the adjustment signal, is then altered in amplitude by the voltage controlled attenuator 218A and the resultant signal is subtracted from the received optical signal. In this embodiment, this subtraction is effected by inversion in the inverter 219A followed by addition in the adder 211A. However it would of course be equally possible to omit the inverter 219A and to utilize a subtractor in place of the adder 211A. An amplitude control signal S3 determines a degree of attenuation provided by the phase adjustment circuit 217A. The amplitude control signal S3 is derived during the idle intervals between successive packets in the transmission signal S1, i.e. intervals in which the switch 234A is held closed by a switch control signal S8 produced from the interface circuit 231A, and is obtained across the capacitor 228A of the low-pass filter. The switch control signal S8 goes to the active level (for closing the switch 234a) during each idle interval between the data packets of the input signal to the interface circuit 231A. Thus, signal S8 is available as the control signal 82a in the circuit of FIG. 7 described above. The amplitude control signal S3 is maintained at a level whereby the inverted output signal from the voltage controlled attenuator 218A will almost exactly cancel out the received unwanted pilot signal component. During each data packet in the transmission signal S1, the switch control signal S8 from the interface circuit 231A holds the switch 234A in the open state, so that the level of the amplitude control signal S3 is held constant by capacitor 228A. That is to say, although it is not possible to detect the level of unwanted received signal components due to reflected light while a data packet is being transmitted by the optical transmitting section 201A, the information derived during each idle interval of the transmission signal S1 (i.e. each interval in which the pilot signal is inserted into the transmission signal S1) is utilized to achieve cancellation of the unwanted received signal components during transmission of a data packet by the optical transmitting section 201A.

In order to enable simultaneous bidirectional data transmission, it is essential that each of the optical T/R apparatuses A and B does not respond to the pilot signal which is generated by the opposing optical T/R apparatus, so that it is necessary to use respectively different values of frequency for the pilot signals which are inserted by the optical T/R apparatuses A and B, i.e. to enable pilot signal selection by means of band-pass filtering. The frequency of the pilot signal of the optical T/R apparatus A shown in FIG. 22 can be for example 1 MHz, while that of the optical T/R apparatus B can be 1.5 MHz. If the pilot signal frequency is in the region of 1 MHz, then it becomes easily possible to eliminate any remaining pilot signal components in the received data signal. This can be achieved by a bandpass or high pass filter within the interface circuit 233A, which excludes frequencies of lower than approximately 2 MHz, for example, so that only the desired packed data components are produced from the interface circuit 233A. Such a filter will also exclude noise components due to inverter-type fluorescent lighting, as described hereinabove.

It should be noted that certain relationships of pilot signal frequency, between the two opposing optical T/R apparatuses, are undesirable. For example, if the pilot signal frequency of optical T/R apparatus A is made 1 MHz and that of the opposing optical T/R apparatus B is made 2 MHz, then problems will arise due to the fact that the first harmonic of the pilot signal of optical T/R apparatus A is 2 MHz. However if the respective pilot signal frequencies are selected as 1 MHz and 1.5 MHz for example, then such problems are avoided.

The emitted light from the optical transmitting section of the opposing optical T/R apparatus B, and any light emitted from the LED 207A which is reflected back, are received by the photodiode 209A of the optical receiving section 202A. The resultant electrical signal is transferred through the input amplifier 210A, adder 211A and amplifier 212A to be supplied to the binary converter 232A and to the BPF 222A of the return light cancellation section 203A. The bandpass filter 222A selects a frequency component corresponding to the frequency of the pilot signal inserted by the interface circuit 231A (e.g. 1 MHz) and supplies a resultant signal, referred to in the following as the detection signal component S6, to the amplifier 225A. Signal S6 is thereby converted to a binary signal by the converter 226A, and supplied to the data (D) input of the D-FF 223A. The transmission signal S1 from the interface circuit 231A is supplied as a phase reference signal to the clock input (CK) of the D-FF 223A, which functions as a digital phase comparator, producing an output signal at either the high or low logic level in accordance with whether the detection signal component applied to the D input is advanced or retarded in phase with respect to the reference signal applied to the CK input. During each idle interval between successive packets of the data stream supplied to the interface circuit 231A, when the switch 234A is set in the closed state, the output signal from the D-FF 223A is supplied to resistor 227A of the low-pass filter, to obtain the amplitude control signal S3 across capacitor 228A. The transmission signal S1, after being adjusted in phase by a fixed amount in the phase adjustment circuit 217A to obtain phase-adjusted signal S4, is adjusted in amplitude by the voltage controlled attenuator 218A in accordance with the level of the amplitude control signal S3, and the resultant amplitude-adjusted signal is then inverted by inverter 219A to obtain the cancellation signal S7, which is applied to the second input of the adder 211A. If the amplitude of the cancellation signal S7 is identical to that of the pilot signal reflection component in the reception signal S2 from the input amplifier 210A, then cancellation of all components of the reflection signal is achieved.

It can be understood that with this embodiment, cancellation of the reflection signal is achieved by a feedback control loop based on a digital phase comparator, with the loop time constant being determined by the low-pass filter which produces the amplitude control signal S3. The operation is based on the assumption that the phase of any back-reflected pilot signal component in the received signal is substantially fixed, in relation to the pilot signal within the transmission signal S1. That assumption is valid for the following reasons. The only variable factor which affects the phase difference between the pilot signal of the transmission signal S1 of the optical transmitting section 201A and the reflected pilot signal component is the length of the path over which the reflected light travels. Substantial amounts of phase shift are introduced by various receiving circuit components, and in particular by the bandpass filter 222A. However such phase shift amounts are constant. The total length of the reflection transmission path (i.e. referring to FIG. 21, the path from the optical transmitting section 201A to the reflecting body 216 then back to the optical receiving section 202A) will be designated as L, in which case the amount of time delay τ for transmission over that path is obtained as:

$$g = L/c = 0.033 \text{ (ns)} \tag{1}$$

In the above, c designates the velocity of light in air, which is $3 \times 10^{10}$ cm/sec.

Assuming the data rate within the packets is 10 Mbps, i.e. corresponding to a data clock frequency of 10 MHz with a clock period of 100 ns, and assuming that the length of the reflection transmission path L is 10 cm, then the amount of phase shift which occurs in the data as a result of transmission over the reflection transmission path is obtained, using the time delay obtained from equation(a) above, as:

$$(0.033 \times 10 \times 360)/100 = 1.19 \text{ (degrees)}$$

It can thus be understood that the amount of phase shift which occurs over a reflection transmission path of approximately 10 cm, and hence the amount of possible variation of phase shift of the reflected pilot signal component, is negligible. As stated above, the only variable factor which affects the amount of phase shift of the reflected pilot signal component in the received signal obtained by the optical receiving section 202A is the reflection path length, so that the amount of phase shift can be assumed to be substantially constant.

The above assumption is not valid in the case of a reflection path length of substantially more than 10 cm. However since the intensity of the reflected light falls off in accordance with the inverse square law, the level of such reflected transmitted light will be sufficiently low that it can be ignored.

Figure 22:
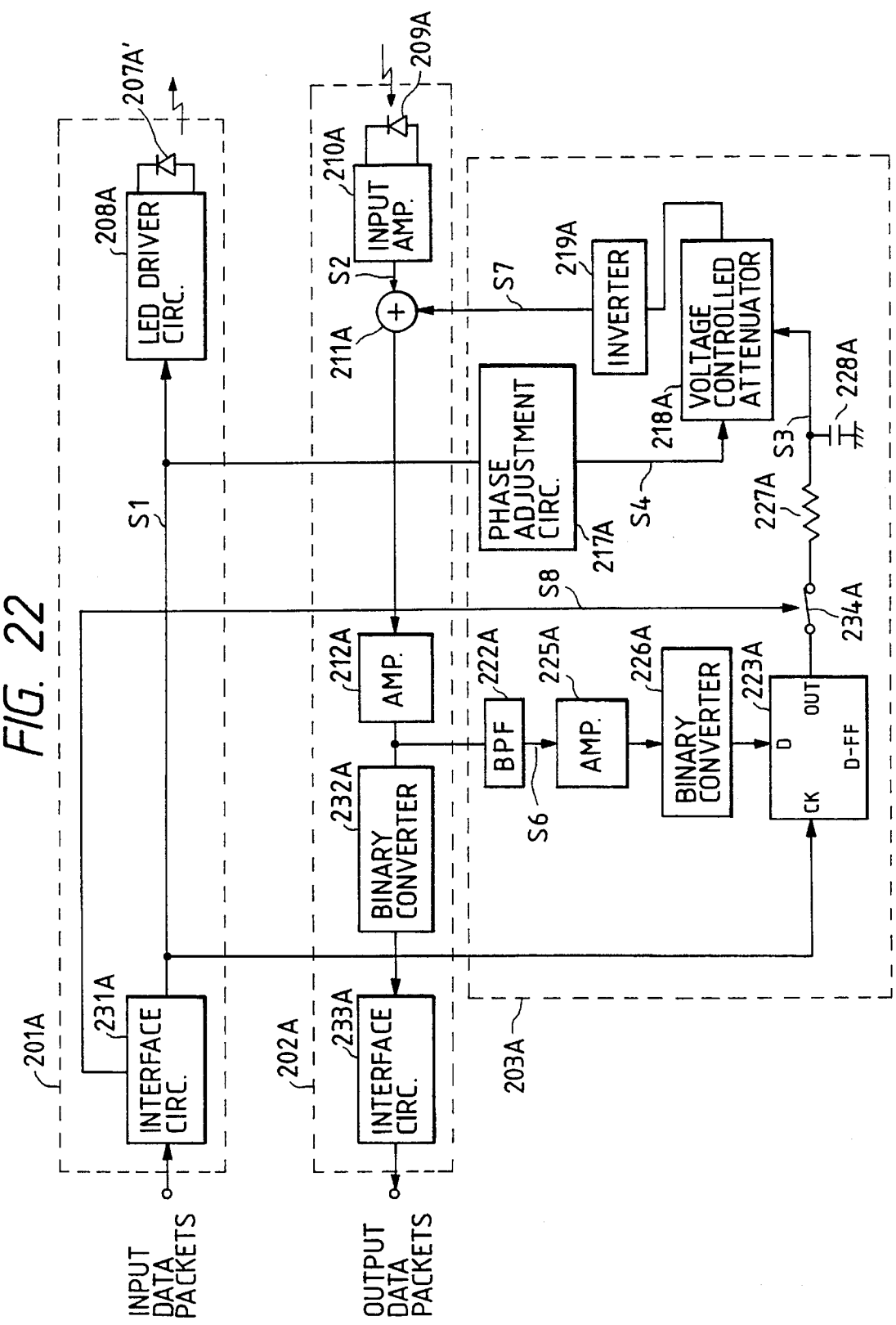
FIG. 22 is a system block diagram of an embodiment of an optical data transmitting/receiving apparatus provided with a return light cancellation function.

It is for that reason that a fixed amount of phase shift is applied by the phase adjustment circuit 217A in FIG. 22, to bring the phase of the pilot signal obtained from the transmission signal S1 into exact coincidence with that of the reflected pilot signal component which is contained in the reception signal S2. Since as described above the amount of phase shift that is due to the reflection transmission path is very small the fixed amount of phase shift applied by circuit 217A serves to compensate for the total amount of phase shift which occurs due to successive propogation through the drive circuit 8A, the LED 7A, the photodiode 9a, and the amplifier 10A.

The amplitude of the reflected pilot signal component, however, can vary substantially in accordance with changes in the reflection conditions. For that reason, the amplitude of the cancellation signal S7 is automatically controlled by the aforementioned control loop, such as to match the amplitude of the received reflected signal.

The action of the D-FF 223A within the pilot signal cancellation control loop will be described referring to the timing diagrams of FIG. 24. Diagram (A) of FIG. 24 shows the pilot signal of the transmission signal S1 which is applied to the CK input of the D-FF 223A in each idle interval between successive data packets. Latching of the logic state of the D input of the D-FF 223A is performed at each rising edge of the CK input signal, as indicated by the vertical arrows. Diagram (B) shows an example of the input signal applied to the D input of the D-FF 223A, which has been derived by amplifying and binary conversion of pilot signal components that are contained in the output signal from adder 211A. In this example, the signal applied to the D input is advanced in phase in relation to the CK signal input signal, so that the output signal level from the D-FF 223A is held at the L (low) logic level. This indicates a condition in which the amount of cancellation which is being applied by the output signal from the voltage controlled attenuator 218A is insufficient. Diagram (C) shows an example of the input signal applied to the D input of the D-FF 223A, in which the signal applied to the D input is delayed in phase in relation to the CK signal input signal, so that the output signal level from the D-FF 223A is held at the H (high) logic level. This indicates a condition in which the amount of cancellation which is being applied by the output signal from the voltage controlled attenuator 218A is excessively high. That is to say, the cancellation signal S7 produced from the inverter circuit 219A differs by 180° from the reflected pilot signal component within the reception signal S2, as described above. Hence if the amplitude of the cancellation signal S7 is greater than that of the reflected pilot signal component in the reception signal S2, a waveform of the form shown in diagram (D) of FIG. 24 will appear in the output from binary converter 226A.

In practice, the output voltage from the D-FF 223A will vary between the H and L levels, such that the average value of that voltage (i.e. the level of amplitude control signal S3) will ensure substantially complete cancellation of the reflected pilot signal component.

While a data packet is being transmitted by the transmission signal S1, the switch control signal S8 holds the switch 234A in the open state, so that the most recently established value of amplitude control signal S3 is held unchanged, until the start of the next idle interval between transmitted data packets. In that condition, any reflected self-transmitted data component in the received optical signal will be cancelled in the same manner as has been described above for cancellation of the reflected pilot signal component. Effective cancellation of the reflected self-transmitted data component, during optical transmission of a data packet, is thereby achieved, in spite of the fact that detection of that reflected self-transmitted data component by an optical T/R apparatus cannot be performed during transmission of a packet by that same optical T/R apparatus.

It will be apparent that various modifications to the above embodiment could be envisaged, and in particular it should be understood that this aspect of the invention is not limited to the use of the specific circuit arrangement shown in FIG. 22 for deriving the amplitude control signal S3. As noted above, if a subtractor is used in place of the adder 211A then the inverter 219A can be omitted. Alternatively, the inverter 219A could be positioned between the phase adjustment circuit 217A and the voltage controlled attenuator 218A, or the inverting function could be internally performed by the phase adjustment circuit 217A.

Figure 25:
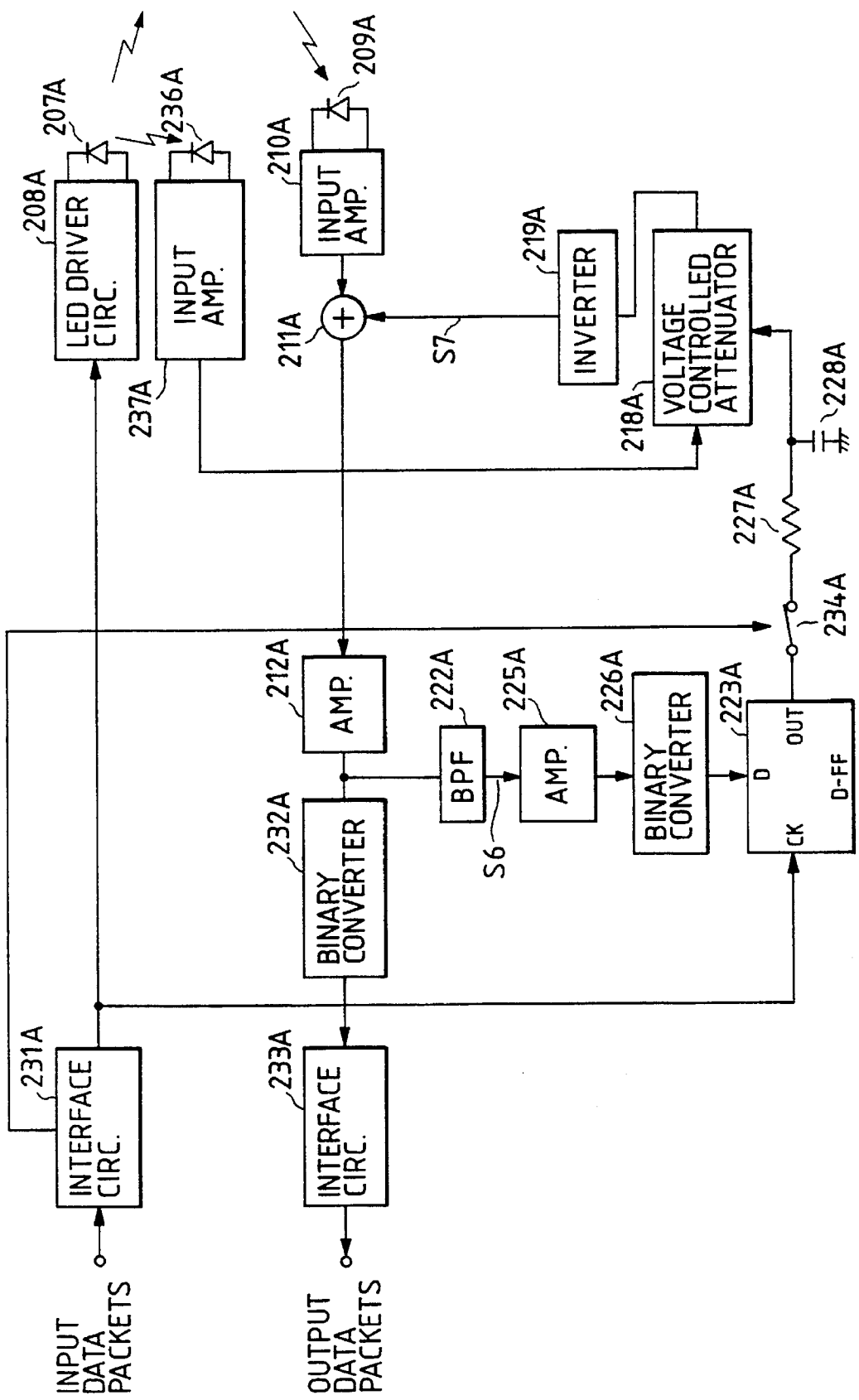
FIG. 25 is a system block diagram of another embodiment of an optical data transmitting/receiving apparatus with a return light cancellation function.

Another embodiment of the invention, having the same objectives and a similar configuration to the above embodiment, will be described referring to FIG. 25. With this embodiment, instead of applying a fixed amount of phase shift (by the phase adjustment circuit 217A) to the transmission signal which is branched off for use in producing the cancellation signal S7 as in the preceding embodiment, it is ensured with this embodiment that such phase adjustment is made unnecessary. This is achieved by providing an additional photodiode 236A and an additional input amplifier circuit 237A for amplifying the signal obtained from the photodiode 236A, with the photodiode 236A being positioned such as to directly receive part of the light emitted from the LED 7A. In this case, rather than utilizing the transmission signal supplied to the driver circuit 208A to derive the cancellation signal, the reception signal that is produced from the input amplifier 237A is used for that purpose. As a result, the pilot signal contained in that reception signal, which is supplied to the voltage controlled attenuator 218A, will be substantially accurately in phase with the reflected pilot signal component within the output signal from the input amplifier 210A. Thus, the phase adjustment circuit 217A of the preceding embodiment can be eliminated.

In other respects, the operation of this embodiment is identical to that of the preceding embodiment, so that further description will be omitted.

Figure 26:
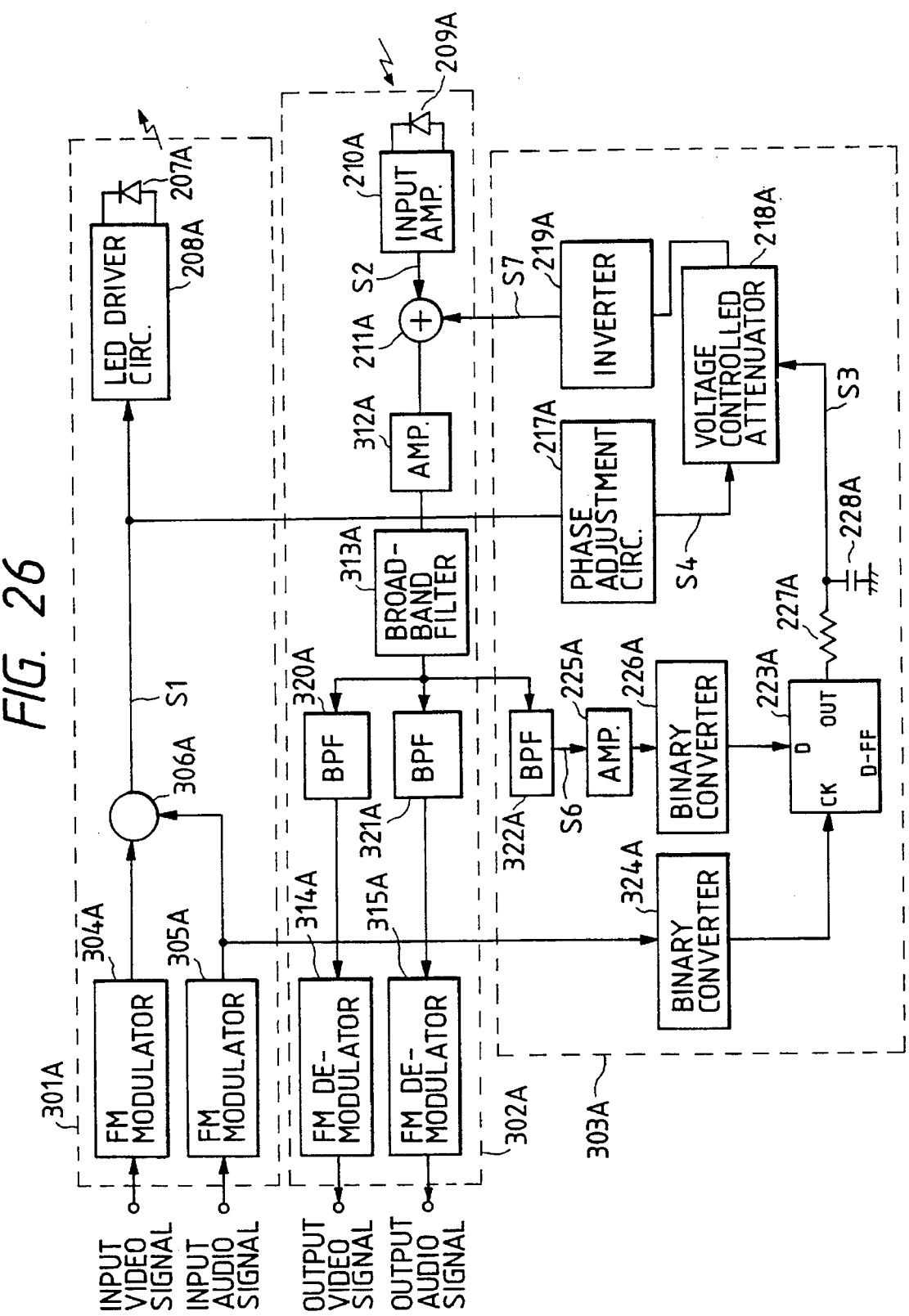
FIG. 26 is a system block diagram of an embodiment of an optical signal transmitting/receiving apparatus for optical transmission of video and audio signals.

Although each of the above optical wireless T/R apparatus embodiments has been described for the case of transmission of a baseband data signal between two optical wireless data T/R apparatuses, with baseband signals being transmitted/received, the invention is basically also applicable to optical transmission of audio and/or video signals by modulated high-frequency signals. In the case of transmitting a combination of a video signal and audio signal, this can be achieved by frequency modulating respective carriers by the video and audio signals, frequency multiplexing the resultant signals to obtain a transmission signal, and applying the transmission signal to intensity-modulate light emitted from a photo-emissive device such as a LED. This will be exemplified by the following embodiment, which incorporates a self-transmitted reflection signal cancellation feature which is similar to that of the embodiment of FIG. 22 described above. Optical signal communication is provided between two opposing optical wireless signal transmitting/receiving apparatuses, which will be referred to as optical T/R apparatuses A and B respectively. These may be spaced apart by a distance of approximately 10 cm, for example. FIG. 26 is a system block diagram of an optical T/R apparatus A of this embodiment, which serves to optically transmit/receive a video signal and audio signal to/from an optical T/R apparatus B which is of identical internal configuration to optical T/R apparatus A. In FIG. 26, components and circuit blocks corresponding to those of FIG. 22 described above are designated by identical reference numerals to those of FIG. 22, and detailed description of these will be omitted.

The optical T/R apparatus of FIG. 26 is made up of an optical transmitting section 301A, an optical receiving section 302A and a return light cancellation section 303A. The optical transmitting section 301A includes first and second FM modulators 304A, 305A, which receive an input video signal and input audio signal, respectively. In the FM modulator 304A, the input video signal modulates a carrier to obtain a FM video signal which will be assumed for example to have a frequency spectrum extending from 6 MHz to 20 MHz, as shown in the spectrum diagram of FIG. 27. In the FM modulator 305A, the input audio signal modulates a carrier, which will be assumed to have a frequency of 2.3 MHz for example, to obtain a FM audio signal. That signal will have the frequency spectrum shown in FIG. 27, i.e. centered on 2.3 MHz. The FM video signal and FM audio signal are combined in an adder 306A to obtain a transmission signal S1, which is applied via a driver circuit 208A to intensity-modulate light which is emitted from an LED 207A.

Figure 27:
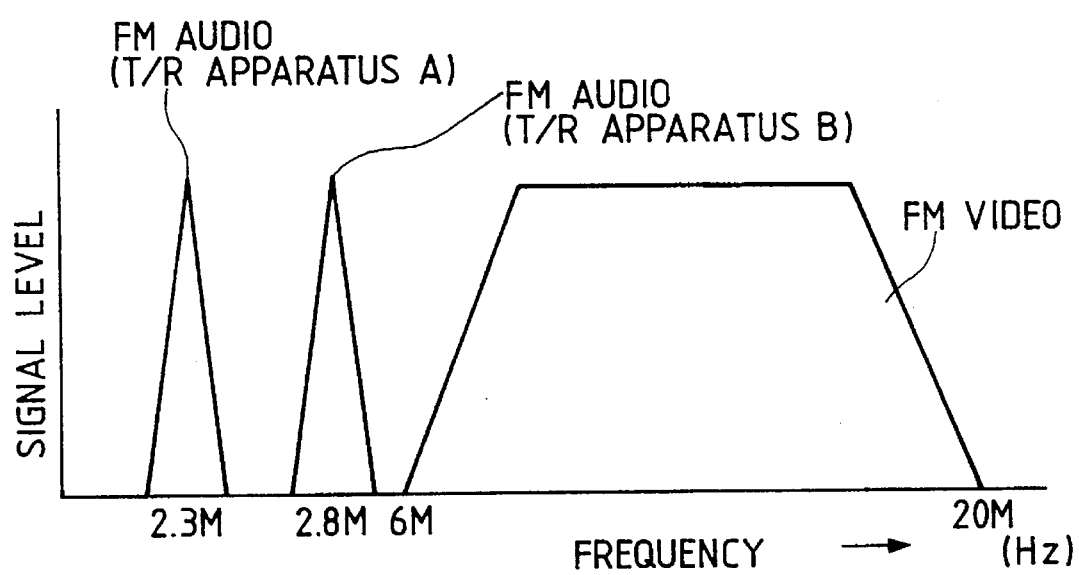
FIG. 27 is a spectrum diagram showing respective frequency spectrums of output signals from two communicating optical transmitting/receiving apparatuses which are each of the form shown in FIG. 26.

In the embodiment of FIG. 22, since the pilot signal generated by an optical T/R apparatus is utilized in detecting and cancelling a self-transmitted received signal component, it is necessary to utilized respectively different values of pilot signal frequency in two opposing optical T/R apparatuses between which data are transferred. This enables selection of only the locally generated pilot signal component, from the received signal, by a bandpass filter. In the embodiment of FIG. 26, the FM audio signal produced from the second FM modulator 305 is used for the same purpose. Hence, it is necessary to use respectively different values of audio FM modulation carrier frequency in the two opposing optical T/R apparatuses. As illustrated in FIG. 27, the opposing optical T/R apparatus to that of FIG. 26 (i.e optical T/R apparatus B) can utilize an audio FM carrier frequency of 2.8 MHz, for example, when an audio FM carrier frequency of 2.3 MHz is used by optical T/R apparatus A. The same FM video frequency range (e.g. 6 MHz to 20 MHz in the example of FIG. 27) is used by both of the optical T/R apparatuses A and B.

In the return light cancellation section 303A of FIG. 26, the transmitted optical signal from the opposing optical T/R apparatus B is received by a photodiode 209A, and a corresponding reception signal S2 is produced by an input amplifier 210a and supplied to one input of an adder 211A. The output signal from the adder 211A is supplied to an amplifier 312A, whose output signal is then transferred through a wide-band bandpass filter 313A. That filter has a passband which extends from the lower limit of the passbands of the FM audio signal filter 321A and the detection signal component filter 322A to the upper limit of the FM video signal spectrum. The resultant output signal is supplied to a first bandpass filter 320A having a passband for selecting the FM video signal component, which is then supplied to a first FM demodulator circuit 314A, to obtain an output video signal. The output signal from the wide-band bandpass filter 313A is also supplied to a second bandpass filter 321A having a passband for selecting the FM audio signal component that has been transmitted from optical T/R apparatus B, i.e. having a center frequency of 2.8 MHz in the example of FIG. 27. That FM audio signal is then supplied to a second FM demodulator circuit 315A, to obtain an output audio signal.

In the return light cancellation section 303A, the output signal from the wide-band bandpass filter 313A is supplied to a bandpass filter 322A, having a center frequency of 2.3 MHz, to select any self-transmitted reflected FM audio signal component contained in the received signal. The resultant signal, referred to as the detection component signal S6, is converted to a binary signal by a binary converter circuit 226A, which is applied to the D input of a D-FF 223A. The FM audio signal produced from the FM modulator 305A is converted to binary form by a binary converter 324A, and applied as a phase reference signal to the CK input of the D-FF 223A. The output signal from the D-FF 223A is supplied to a low-pass filter made up of a resistor 227A and capacitor 228A, to obtain an amplitude control signal S3. The amplitude control signal S3 is applied to control a degree of attenuation provided by a voltage controlled attenuator 218A. The voltage controlled attenuator 218A attenuates the transmission signal S1 from adder 306A, after that transmission signal has been phase shifted by a fixed amount by a phase adjuster circuit 217A, and the resultant adjusted signal S4 is attenuated by the voltage controlled attenuator 218A, with the resultant signal being inverted by an inverter 219A to obtain a cancellation signal S7. The cancellation signal S7 is applied to a second input of the adder 211A.

It can be understood that the operation of the return light cancellation section 303A of this embodiment is essentially the same as that of the return light cancellation section 203A in the embodiment of FIG. 22 above. The D-FF 223A functions as a phase comparator, comparing the phase of the locally generated FM audio signal having a 2.3 MHz carrier frequency with that of a FM audio signal component (which also has a 2.3 MHz carrier frequency) in the signal that is received by the optical receiving section 302A. That is to say, the output signal from the D-FF 223A repetitively varies between the H and L levels, in accordance with whether the level of the cancellation signal S7 is greater than or less than the exact value required to cancel a self-transmitted reflected FM audio signal component in the reception signal that is produced from the input amplifier 210A. The amplitude control signal S3 is thereby held at a value whereby such a reflected FM audio signal component, and therefore also a reflected FM video signal component in the received optical signal, will be substantially completely cancelled by the addition of the cancellation signal S7 to the reception signal S2. The effects of such reflection can thereby be effectively eliminated.

Although the invention has been described in the above referring to specific embodiments, it should be understood that various modifications to these embodiments could be envisaged, which fall within the scope claimed for the invention.

What is claimed is:

1. An optical wireless data transmission system providing simultaneous bidirectional transmission of data by optical signals between at least a first optical signal transmitting and receiving apparatus and a second optical signal transmitting and receiving apparatus, each of said first and second optical signal transmitting and receiving apparatuses including photoemissive means for producing a transmitted optical signal and photoreceptive means for converting a received optical signal to a reception signal, wherein each of said first and second optical signal transmitting and receiving apparatuses comprises:

isolating means for optically isolating said photoreceptive means thereof from an optical signal emitted by said photoemissive means thereof; and means for generating said optical signal from a biphase code electrical signal by baseband modulation of an intensity of light which is emitted by said photoemissive means thereof, wherein said data are conveyed as data packets, and wherein each of said first and second optical signal transmitting and receiving apparatuses comprises means for inserting into said optical signal generated by said photoemissive means thereof, within each of respective vacant intervals between said data packets, a pilot signal having an amplitude which is similar to an amplitude of said optical signal within said data packets.

2. An optical wireless data transmission system according to claim 1, wherein said pilot signal is a fixed-frequency periodic signal.

3. An optical wireless data transmission system according to claim 1, wherein:

said second optical signal transmitting and receiving apparatus comprises first detection means for detecting the presence of said pilot signal within a received optical signal, as an indication of a satisfactory signal reception condition, and means controlled by said first detection means for transmitting an optical signal containing said pilot signal only when said satisfactory reception condition is detected; and said first optical signal transmitting and receiving apparatus comprises second detection means for detecting the presence of said pilot signal in an optical signal received from said second optical signal transmitting and receiving apparatus, and indication means controlled by said second detection means for producing a visible indication or an audible indication that said pilot signal is being received.

4. An optical wireless data transmission system providing simultaneous bidirectional transmission of data by optical signals between at least a first optical signal transmitting and receiving apparatus and a second optical signal transmitting and receiving apparatus, each of said first and second optical signal transmitting and receiving apparatuses including photoemissive means for producing a transmitted optical signal and photoreceptive means for converting a received optical signal to a reception signal, wherein each of said first and second optical signal transmitting and receiving apparatuses comprises:

isolating means for optically isolating said photoreceptive means thereof from an optical signal emitted by said photoemissive means thereof; and means for generating said optical signal from a biphase code electrical signal by baseband modulation of an intensity of light which is emitted by said photoemissive means thereof, wherein said at least one of said first optical signal transmitting and receiving apparatus and said second optical signal transmitting and receiving apparatus comprises detection means for detection of a level of a received optical signal, and indication means controlled in accordance with said detection for producing a visible or audible indication that data communication between said first and second optical signal transmitting and receiving apparatuses is possible.

5. An optical wireless data transmission system providing simultaneous bidirectional transmission of data by optical signals between at least a first optical signal transmitting and receiving apparatus and a second optical signal transmitting and receiving apparatus, each of said first and second optical signal transmitting and receiving apparatuses including photoemissive means for producing a transmitted optical signal and photoreceptive means for converting a received optical signal to a reception signal wherein each of said first and second optical signal transmitting and receiving apparatuses comprises:

isolating means for optically isolating said photoreceptive means thereof from an optical signal emitted by said photoemissive means thereof; and means for generating said optical signal from a biphase code electrical signal by baseband modulation of an intensity of light which is emitted by said photoemissive means thereof, wherein said photoreceptive means and said photoemissive means of said first optical signal transmitting and receiving apparatus are positioned close to an upper side and to a lower side respectively of said first optical signal transmitting and receiving apparatus, and wherein first optical signal transmitting and receiving apparatus is positioned with said photoemissive means and photoreceptive means thereof close to but spaced apart from said photoemissive means and photoreceptive means of said second optical signal transmitting and receiving apparatus, said system further comprising means formed on said upper side of said first optical signal transmitting and receiving apparatus for at least partially shielding said photoreceptive means of said first optical signal transmitting and receiving apparatus from external illumination, and wherein said second optical signal transmitting and receiving apparatus is formed upon a card which is substantially entirely contained within a slot of a personal computer and is horizontally oriented, with said photoemissive means and photoreceptive means of said second optical signal transmitting and receiving apparatus formed upon an edge portion of said card, said edge portion being exposed to the exterior of said slot.

6. An optical wireless data transmission system providing simultaneous bidirectional transmission of data by optical signals between at least a first optical signal transmitting and receiving apparatus and a second optical signal transmitting and receiving apparatus, each of said first and second optical signal transmitting and receiving apparatuses including photoemissive means for producing a transmitted optical signal and photoreceptive means for converting a received optical signal to a reception signal, wherein each of said first and second optical signal transmitting and receiving apparatuses comprises:

isolating means for optically isolating said photoreceptive means thereof from an optical signal emitted by said photoemissive means thereof; and means for generating said optical signal from a biphase code electrical signal by baseband modulation of an intensity of light which is emitted by said photoemissive means thereof, wherein said photoemissive means and said photoreceptive means of each of said first optical signal transmitting and receiving apparatus and said second optical signal transmitting and receiving apparatus are configured to have broad directionality in a horizontal direction and narrow directionality in a vertical direction, and wherein each of said photoemissive means and said photoreceptive means of each of said first optical signal transmitting and receiving apparatus and second optical signal transmitting and receiving apparatus comprises a cylindrical lens having a longitudinal axis which is horizontally oriented.

7. An optical wireless data transmission system providing simultaneous bidirectional transmission of data by optical signals between at least a first optical signal transmitting and receiving apparatus and a second optical signal transmitting and receiving apparatus, each of said first and second optical signal transmitting and receiving apparatuses including photoemissive means for producing a transmitted optical signal and photoreceptive means for converting a received optical signal to a reception signal, wherein each of said first and second optical signal transmitting and receiving apparatuses comprises:

isolating means for optically isolating said photoreceptive means thereof from an optical signal emitted by said photoemissive means thereof; and means for generating said optical signal from a biphase code electrical signal by baseband modulation of an intensity of light which is emitted by said photoemissive means thereof, comprising magnetic attraction means for retaining said first optical signal transmitting and receiving apparatus and said second optical signal transmitting and receiving apparatus in a mutually removably attached condition, with an optical communication path established between said first and second optical signal transmitting and receiving apparatuses.

8. An optical wireless data transmission system according to claim 7, wherein said second optical signal transmitting and receiving apparatus is formed upon a card which is substantially entirely contained within a slot of a personal computer, with said photoemissive means and photoreceptive means of said second optical signal transmitting and receiving apparatus formed upon an edge portion of said card which is exposed to the exterior of said slot, and wherein said magnetic attraction means comprises at least a first permanent magnet which is fixedly attached to said edge portion and a second permanent magnet which is fixedly attached to said first optical signal transmitting and receiving apparatus.

9. An optical wireless data transmission system according to claim 8, wherein said card is horizontally oriented within said personal computer, wherein said photoemissive means and photoreceptive means of said second optical signal transmitting and receiving apparatus comprise at least one photoemissive element and at least one photoreceptive element which are disposed at horizontally opposing positions, and wherein second permanent magnet is of elongated shape and is vertically oriented, for enabling selective positioning of said first optical signal transmitting and receiving apparatus at a plurality of different heights with respect to said second optical signal transmitting and receiving apparatus.

10. An optical wireless data transmission system according to claim 9, wherein said photoemissive means and photoreceptive means of said first optical signal transmitting and receiving apparatus comprise a plurality of pairs of horizontally opposing elements disposed at respectively different heights, each of said pairs comprising a photoemissive element and a photoreceptive element.

11. An optical wireless data transmission system providing simultaneous bidirectional transmission of data by optical signals between at least a first optical signal transmitting and receiving apparatus and a second optical signal transmitting and receiving apparatus, each of said first and second optical signal transmitting and receiving apparatuses including photoemissive means for producing a transmitted optical signal and Photoreceptive means for converting a received optical signal to a reception signal, wherein each of said first and second optical signal transmitting and receiving apparatuses comprises:

isolating means for optically isolating said photoreceptive means thereof from an optical signal emitted by said photoemissive means thereof;

means for generating said optical signal from a biphase code electrical signal by baseband modulation of an intensity of light which is emitted by said photoemissive means Thereof, wherein said second optical signal transmitting and receiving apparatus is formed upon a card which is entirely contained within a slot of a personal computer, with said photoemissive means and photoreceptive means of said second optical signal transmitting and receiving apparatus formed upon an edge portion of said card which is adjacent to the exterior of said slot, said second optical signal transmitting and receiving apparatus further comprising a movable member provided with a mirror surface, said member being selectively movable to a retracted position within said slot and to an extended position which is external to said slot, said mirror surface being oriented to provide an increased size of service area for optical communication when said member is in said extended position.

12. An optical wireless data transmission system providing simultaneous bidirectional transmission of data by optical signals between at least a first optical signal transmitting and receiving apparatus and a second optical signal transmitting and receiving apparatus, each of said first and second optical signal transmitting and receiving apparatuses including photoemissive means for producing a transmitted optical signal and photoreceptive means for converting a received optical signal to a reception signal, wherein each of said first and second optical signal transmitting and receiving apparatuses comprises:

isolating means for optically isolating said photoreceptive means thereof from an optical signal emitted by said photoemissive means thereof; and means for generating said optical signal from a biphase code electrical signal by baseband modulation of an intensity of light which is emitted by said photoemissive means thereof, wherein said data are conveyed as data packets, and wherein at least one of said first and second optical signal transmitting and receiving apparatuses includes return light cancellation means comprising:

pilot signal insertion means for inserting a pilot signal of fixed frequency into an input data signal which conveys said data packets, within each of respective idle intervals between said data packets, to thereby obtain a transmission signal, and for supplying said transmission signal to said photoemissive means to produce a transmitted optical signal;

filter means for extracting, from a reception signal produced by said photoreceptive means, a detection signal component having an identical frequency to said pilot signal;

comparator means for executing phase comparison between said pilot signal and said detection signal component, and for obtaining an amplitude control signal which varies in level in accordance with results of said phase comparison;

means for applying a fixed amount of phase adjustment to said transmission signal to obtain an adjustment signal, and means responsive to said amplitude control signal for altering the amplitude of said adjustment signal to obtain a cancellation signal; and means for combining said cancellation signal with said reception signal, to reduce the amplitude of said detection signal component.

13. An optical wireless data transmission system according to claim 12, wherein each of said first and second optical signal transmitting and receiving apparatus comprises said return light cancellation circuit means, and wherein the frequency of said pilot signal generated in said first optical signal transmitting and receiving apparatus is made different by a fixed amount from the frequency of said pilot signal generated in said second optical signal transmitting and receiving apparatus.

14. An optical wireless data transmission system according to claim 12, wherein said pilot signal insertion means generates a switch control signal at a first level during each of said data packets within said input data signal and at a second level during each of said idle intervals, and further comprising signal holding means controlled by said switch control signal for holding said amplitude control signal at an unchanging level during each of said data packets of said input data signal.

15. An optical wireless data transmission system according to claim 14, wherein said comparator means comprises a phase comparator element and a low-pass filter circuit including a capacitor, said low-pass filter circuit being coupled to receive an output signal from said phase comparator element, and wherein said signal holding means is constituted by said capacitor and by a switch which is controlled by said switch control signal to isolate said capacitor from said output signal of the phase comparator element during each of said data packets of said input data signal.

16. An optical wireless data transmission system according to claim 12, wherein said pilot signal insertion means comprises:

means for generating said pilot signal;

packet detection means coupled to receive said input data signal, for detecting start and end codes within each of said data packets and for thereby producing an output signal at a first level during each of said data packets within said input data signal and at a second level during each of said idle intervals; and gate circuit means controlled by said output signal from said packet detection means for inserting said pilot signal into each of said idle intervals.

17. An optical wireless data transmission system providing simultaneous bidirectional transmission of data by optical signals between at least a first optical signal transmitting and receiving apparatus and a second optical signal transmitting and receiving apparatus, each of said first and second optical signal transmitting and receiving apparatuses including photoemissive means for producing a transmitted optical signal and photoreceptive means for converting a received optical signal to a reception signal, wherein each of said first and second optical signal transmitting and receiving apparatuses comprises:

isolating means for optically isolating said photoreceptive means thereof from an optical signal emitted by said photoemissive means thereof; and means for generating said optical signal from a biphase code electrical signal by baseband modulation of an intensity of light which is emitted by said photoemissive means thereof, wherein said data are conveyed as data packets, and wherein at least one of said first and second optical signal transmitting and receiving apparatuses includes return light cancellation means comprising:

pilot signal insertion means for inserting a pilot signal of fixed frequency into an input data signal which conveys said data packets, within each of respective idle intervals between said data packets, to thereby obtain a transmission signal, and for supplying said transmission signal to said photoemissive means to produce a transmitted optical signal;

second photoreceptive means for converting a received optical signal to a second reception signal;

filter means for extracting from said second reception signal a detection signal component having an identical frequency to said pilot signal;

comparator means for executing phase comparison between said pilot signal and said detection signal component, and for obtaining an amplitude control signal which varies in level in accordance with results of said phase comparison;

means for applying a fixed amount of phase shift to said transmission signal to obtain an adjustment signal, and means controlled by said amplitude control signal for altering the amplitude of said adjustment signal to obtain a cancellation signal; and means for combining said cancellation signal with said reception signal, to reduce the amplitude of said detection signal component.

18. An optical wireless data transmission system according to claim 17, wherein each of said first and second optical signal transmitting and receiving apparatus includes said return light cancellation circuit means, and wherein the frequency of said pilot signal generated in said first optical signal transmitting and receiving apparatus is different by a fixed amount from the frequency of said pilot signal generated in said second optical signal transmitting and receiving apparatus.

19. An optical wireless data transmission system according to claim 17, wherein said pilot signal insertion means generates a switch control signal at a first level during each of said data packets within said input data signal and at a second level during each of said idle intervals, and further comprising signal holding means controlled by said switch control signal for holding said amplitude control signal at an unchanging level during each of said data packets of said input data signal.

20. An optical wireless data transmission system according to claim 19, wherein said comparator means comprises a phase comparator element and a low-pass filter circuit including a capacitor, said low-pass filter circuit being coupled to receive an output signal from said phase comparator element, and wherein said signal holding means comprises said capacitor in conjunction with a switch which is controlled by said switch control signal to isolate said capacitor from said output signal of the phase comparator element during each of said data packets of said input data signal.

21. An optical wireless signal transmission system providing signal transmission between at least a first optical signal transmitting and receiving apparatus and a second optical signal transmitting and receiving apparatus, each of said first and second optical signal transmitting and receiving apparatuses including modulator means for producing a transmission signal, photoemissive means responsive to said transmission signal for producing an optical signal, photoreceptive means for converting a received optical signal to a reception signal, and demodulator means for demodulating said reception signal, wherein at least one of said first and second optical wireless transmitting and receiving apparatuses comprises return light cancellation circuit means, comprising:

filter means for extracting from said reception signal a detection signal component which is within a predetermined bandwidth;

phase comparator means coupled to receive from said modulator means a reference signal which is a component of said transmission signal and is within said predetermined bandwidth, for executing phase comparison between said detection signal component and said reference signal and for obtaining an amplitude control signal having a level determined in accordance with results of said phase comparison;

means for applying a specific amount of phase shift to said transmission signal to obtain an adjustment signal, and means controlled by said amplitude control signal for altering the amplitude of said adjustment signal to obtain a cancellation signal; and means for combining said cancellation signal with said reception signal, to reduce the amplitude of said detection signal component.

22. An optical wireless signal transmission system according to claim 21, wherein said amount of phase shift is fixedly predetermined.

23. An optical wireless signal transmission system according to claim 21, wherein said modulator means comprises at least a first modulator circuit and a second modulator circuit for respectively producing a first modulated signal which is within a first bandwidth and a second modulated signal which is within a second bandwidth, and signal combining means for combining said first and second modulated signals to obtain said transmission signal, and wherein said first modulated signal is supplied to said phase comparator means as said reference signal.

24. An optical wireless signal transmission system according to claim 23, wherein said first modulated signal is produced by frequency modulation using an input audio signal and said second modulated signal is produced by frequency modulation using an input video signal.

* * * * *